(12) United States Patent
Yuk et al.

(10) Patent No.: US 11,662,848 B2
(45) Date of Patent: May 30, 2023

(54) DISPLAY DEVICE HAVING TOUCH SIGNALS WITH DIFFERENT PULSE WIDTHS

(71) Applicant: SAMSUNG DISPLAY CO., LTD., Yongin-si (KR)

(72) Inventors: Bo Geun Yuk, Hwaseong-si (KR); Jun Seong Lee, Gwangyang-si (KR); Min Hong Kim, Hwaseong-si (KR); Tae Joon Kim, Seongnam-si (KR); Eung Kwan Lee, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 17/466,405

(22) Filed: Sep. 3, 2021

(65) Prior Publication Data

US 2022/0171483 A1    Jun. 2, 2022

(30) Foreign Application Priority Data

Dec. 1, 2020 (KR) .......................... 10-2020-0165761

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/04184* (2019.05); *G06F 2203/04111* (2013.01)

(58) Field of Classification Search
CPC ... G06F 3/0412; G06F 3/04184; G06F 3/0446
See application file for complete search history.

(56) References Cited

U.S. PATENT DOCUMENTS

| 11,221,701 | B2* | 1/2022 | Oh | G06F 3/04186 |
| 2015/0116247 | A1* | 4/2015 | Inoue | G06F 3/04166 |
| | | | | 345/173 |
| 2017/0153736 | A1* | 6/2017 | Kim | G06F 3/04166 |
| 2018/0011598 | A1* | 1/2018 | Ku | G06F 3/04166 |
| 2019/0294310 | A1* | 9/2019 | Lee | G06F 3/04184 |
| 2020/0081602 | A1* | 3/2020 | Weng | G06F 3/0446 |

FOREIGN PATENT DOCUMENTS

| KR | 10-0376350 | 3/2003 |
| KR | 10-2014-0075543 | 6/2014 |
| KR | 10-2011435 | 8/2019 |
| KR | 10-2004925 | 10/2019 |

* cited by examiner

*Primary Examiner* — Liliana Cerullo
(74) *Attorney, Agent, or Firm* — F. Chau & Associates, LLC

(57) ABSTRACT

A display device includes a display unit comprising a plurality of pixels. A touch sensing unit is disposed on the display unit and comprises a plurality of driving electrodes and a plurality of sensing electrodes. A touch driver supplies a touch driving signal to the driving electrodes through a plurality of driving lines and receives a touch sensing signal from the sensing electrodes through a plurality of sensing lines. During a first horizontal period of one frame period, the touch driver supplies a touch driving signal having a first pulse width to a first partial portion of the driving lines and supplies a touch driving signal having a second pulse width smaller than the first pulse width to a second partial portion of the driving lines that is different from the first partial portion of the driving lines.

20 Claims, 13 Drawing Sheets

DU: SUB, TFTL, EML, TFEL

DISPLAY DEVICE HAVING TOUCH SIGNALS WITH DIFFERENT PULSE WIDTHS

CROSS-REFERENCE TO RELATED APPLICATION

This application claims priority under 35 U.S.C. § 119 to Korean Patent Application No. 10-2020-0165761, filed on Dec. 1, 2020 in the Korean Intellectual Property Office, the disclosure of which is incorporated by reference in its entirety herein.

1. TECHNICAL FIELD

The present inventive concepts relate to a display device.

2. DISCUSSION OF RELATED ART

Display devices are devices for displaying images in various ways. As the information-oriented society advances, increasing demands have been placed on display devices. For example, display devices are employed in various electronic devices such as smartphones, digital cameras, laptop computers, navigation devices, and smart televisions. Examples of display devices include a flat panel display device such as a liquid crystal display device, a field emission display device and an organic light emitting display device. In a light emitting display device, since each of the pixels of a display panel includes a light emitting element that is self emissive, an image can be displayed without requiring a backlight unit for providing light to the display panel.

Recently, a touch sensing unit which recognizes a touch input has been widely applied as an input device of a display device, such as in a smartphone or tablet PC. The touch sensing unit determines whether a user inputs a touch, and calculates a corresponding position as touch input coordinates. When the display unit and the touch sensing unit are driven at the same time, image quality distortion may occur according to a change in a harmonic component of the display unit and the touch sensing unit.

SUMMARY

Aspects of the present inventive concepts provide a display device that reduces image quality distortion while maintaining reliability of touch sensitivity when the display driver performs low speed driving.

However, aspects of the present inventive concepts are not restricted to the ones set forth herein. The above and other aspects of the present inventive concepts will become more apparent to one of ordinary skill in the art to which the present inventive concepts pertain by referencing the detailed description of embodiments given below.

According to an embodiment of the present inventive concepts, a display device includes a display unit comprising a plurality of pixels. A touch sensing unit is disposed on the display unit and comprises a plurality of driving electrodes and a plurality of sensing electrodes. A touch driver is configured to supply a touch driving signal to the plurality of driving electrodes through a plurality of driving lines, and receive a touch sensing signal from the plurality of sensing electrodes through a plurality of sensing lines. During a first horizontal period of one frame period, the touch driver supplies a touch driving signal having a first pulse width to a first partial portion of the plurality of driving lines among the plurality of driving lines and supplies a touch driving signal having a second pulse width smaller than the first pulse width to a second partial portion of the plurality of driving lines among the plurality of the driving lines that is different from the first partial portion of the plurality of driving lines.

In an embodiment, the touch driver may supply, to each of the plurality of driving lines, a touch driving signal having the first pulse width during some horizontal periods of one frame period, and may supply a touch driving signal having the second pulse width during some other horizontal periods of the one frame period.

In an embodiment, the plurality of driving lines may comprise a first driving line and a $k^{th}$ driving line (k is a natural number of 2 or more). During the some horizontal periods, a first touch driving signal supplied to the first driving line may have the first pulse width of a high level, and a $k^{th}$ touch driving signal supplied to the $k^{th}$ driving line may have the second pulse width of a high level. During the some other horizontal periods, the first touch driving signal may have the second pulse width of a high level, and the $k^{th}$ touch driving signal may have the first pulse width of a high level.

In an embodiment, the first touch driving signal having the first pulse width of a high level may descend in synchronization with a falling time of a horizontal synchronization signal.

In an embodiment, the $k^{th}$ touch driving signal having the second pulse width of a high level may rise in synchronization with a rising time of the first touch driving signal having the first pulse width.

In an embodiment, the plurality of driving lines may comprise a first driving line, a second driving line, a third driving line, a $k^{th}$ driving line (k is a natural number of 4 or more), a $(k+1)^{th}$ driving line, and a $(k+2)^{th}$ driving line. During the some horizontal periods, a first touch driving signal supplied to the first driving line, a second touch driving signal supplied to the second driving line, and a third touch driving signal supplied to the third driving line may have the first pulse width of a high level, and a $k^{th}$ touch driving signal supplied to the $k^{th}$ driving line may have the second pulse width of a high level. During the some other horizontal periods, the first touch driving signal may have the second pulse width of a high level, and the $k^{th}$ touch driving signal, a $(k+1)^{th}$ touch driving signal supplied to the $(k+1)^{th}$ driving line, and a $(k+2)^{th}$ touch driving signal supplied to the $(k+2)^{th}$ driving line may have the first pulse width of a high level.

In an embodiment, a phase of the first touch driving signal may be different from phases of the second and third touch driving signals in the some horizontal periods, and a phase of the $k^{th}$ touch driving signal may be different from phases of the $(k+1)^{th}$ and $(k+2)^{th}$ touch driving signals in the some other horizontal periods.

In an embodiment, the first touch driving signal having the first pulse width of a high level may descend in synchronization with a falling time of a horizontal synchronization signal.

In an embodiment, the second and third touch driving signals having the first pulse width of a high level may rise in synchronization with a falling time of a horizontal synchronization signal.

In an embodiment, the $k^{th}$ touch driving signal having the second pulse width of a high level may rise in synchronization with a rising time of the second and third touch driving signals having the first pulse width.

In an embodiment, the touch driver may generate a touch driving signal having the first pulse width of a high level and a touch driving signal having the second pulse width of a high level based on a horizontal synchronization signal having a low level in each of a plurality of horizontal periods.

In an embodiment, each of the plurality of driving lines may be connected to a plurality of driving electrodes arranged in a first direction, and each of the plurality of sensing lines may be connected to a plurality of sensing electrodes arranged in a second direction crossing the first direction.

In an embodiment, the touch driver may supply a touch driving signal having the same phase to each of the plurality of driving lines during a plurality of consecutive frame periods.

According to an embodiment of the present inventive concepts, a display device includes a display unit comprising a plurality of pixels. A touch sensing unit is disposed on the display unit and includes a plurality of driving electrodes and a plurality of sensing electrodes. A display driver is configured to drive the display unit. A touch driver is configured to supply a touch driving signal to the plurality of driving electrodes through a plurality of driving lines, and receive a touch sensing signal from the plurality of sensing electrodes through a plurality of sensing lines. When the display driver drives the display unit at a first frequency, the touch driver supplies touch driving signals having different phases from each other in each of first and second consecutive frame periods, to each of the plurality of driving lines. When the display driver drives the display unit at a second frequency lower than the first frequency, during the same horizontal period of one frame period, the touch driver supplies a touch driving signal having a first pulse width to a first partial portion of driving lines among the plurality of driving lines, and supplies a touch driving signal having a second pulse width smaller than the first pulse width to a second partial portion of driving lines among the plurality of driving lines that is different from the first partial portion of the plurality of driving lines.

In an embodiment, when the display driver drives the display unit at the first frequency, the touch driving signal of the first frame period may descend in synchronization with a falling time of a horizontal synchronization signal, and the touch driving signal of the second frame period may rise in synchronization with a falling time of the horizontal synchronization signal.

In an embodiment, when the display driver drives the display unit at the second frequency, the touch driver may supply, to each of the plurality of driving lines, a touch driving signal having the first pulse width during some horizontal periods of one frame period, and may supply a touch driving signal having the second pulse width during some other horizontal periods of the one frame period.

In an embodiment, the plurality of driving lines may comprise a first driving line and a $k^{th}$ driving line (k is a natural number of 2 or more). When the display driver drives the display unit at the second frequency, during the some horizontal periods, a first touch driving signal supplied to the first driving line may have the first pulse width of a high level, and a $k^{th}$ touch driving signal supplied to the $k^{th}$ driving line may have the second pulse width of a high level. During the some other horizontal periods, the first touch driving signal may have the second pulse width of a high level, and the $k^{th}$ touch driving signal may have the first pulse width of a high level.

In an embodiment, the first touch driving signal having the first pulse width of a high level may descend in synchronization with a falling time of a horizontal synchronization signal. The $k^{th}$ touch driving signal having the second pulse width of a high level may rise in synchronization with a rising time of the first touch driving signal having the first pulse width.

In an embodiment, the plurality of driving lines may comprise a first driving line, a second driving line, a third driving line, a $k^{th}$ driving line (k is a natural number of 4 or more), a $(k+1)^{th}$ driving line, and a $(k+2)^{th}$ driving line. When the display driver drives the display unit at the second frequency, during the some horizontal periods, a first touch driving signal supplied to the first driving line, a second touch driving signal supplied to the second driving line, and a third touch driving signal supplied to the third driving line may have the first pulse width of a high level, and a $k^{th}$ touch driving signal supplied to the $k^{th}$ driving line may have the second pulse width of a high level. During the some other horizontal periods, the first touch driving signal may have the second pulse width of a high level, and the $k^{th}$ touch driving signal, a $(k+1)^{th}$ touch driving signal supplied to the $(k+1)^{th}$ driving line, and a $(k+2)^{th}$ touch driving signal supplied to the $(k+2)^{th}$ driving line may have the first pulse width of a high level.

In an embodiment, the $k^{th}$ touch driving signal having the second pulse width of a high level may rise in synchronization with a rising time of the second and third touch driving signals having the first pulse width.

According to an embodiment of the present inventive concepts, a display device includes a display unit comprising a plurality of pixels connected to data lines. The display unit includes a display driver that supplies data voltages to the data lines. A touch sensing unit is disposed on the display unit and comprises a plurality of driving electrodes and a plurality of sensing electrodes. A touch driver is configured to supply a touch driving signal to the plurality of driving electrodes through a plurality of driving lines, and receive a touch sensing signal from the plurality of sensing electrodes through a plurality of sensing lines. The touch driver is configured to supply a plurality of touch driving signals having different pulse widths from each other during a same horizontal period of one frame to reduce distortion of the data voltages that are coupled to the plurality of touch driving signals.

According to the display device of an embodiment of the present inventive concepts, when the display driver drives the display unit in a low speed mode, during the same horizontal period, the touch driver may supply a touch driving signal having a first pulse width of a high level to some driving lines and may supply a touch driving signal having a second pulse width of a high level to some other driving lines. The data voltage coupled by the touch driving signal having the first pulse width and the data voltage coupled by the touch driving signal having the second pulse width may be partially canceled out, and the display device may reduce image quality distortion by reducing distortion of a data voltage flowing through a data line. Accordingly, the display device may reduce distortion of the data voltage coupled by the touch driving signal and may reduce image quality distortion while maintaining reliability of touch sensitivity, by supplying the touch driving signal having the same phase during a plurality of consecutive frame periods in a low speed mode or a low frequency driving.

It should be noted that the effects of the present inventive concepts are not limited to those described above, and other effects of the present inventive concepts will be apparent from the following description.

BRIEF DESCRIPTION OF THE DRAWINGS

The above and other aspects and features of the present inventive concepts will become more apparent by describing in detail embodiments thereof with reference to the attached drawings, in which.

DETAILED DESCRIPTION OF EMBODIMENTS

Figure 1:
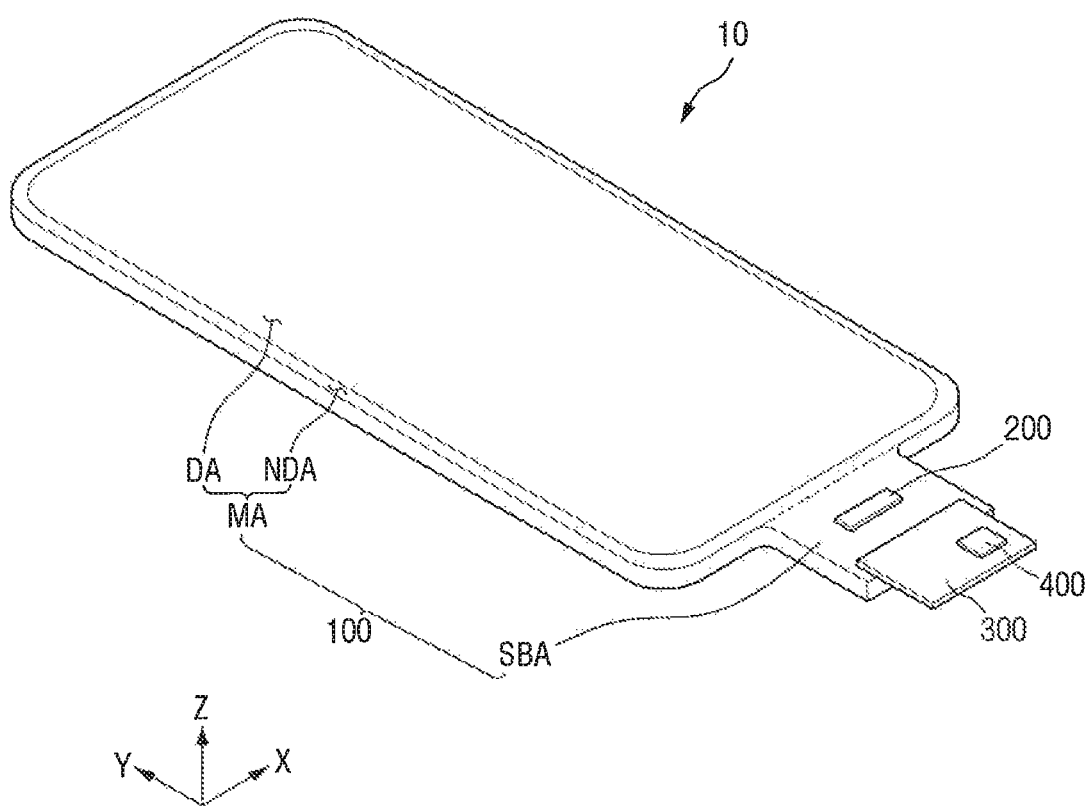
FIG. 1 is a perspective view showing a display device according to an embodiment of the present inventive concepts.

In the following description, for the purposes of explanation, numerous details are set forth to provide a thorough understanding of various embodiments or implementations of the present inventive concepts. As used herein "embodiments" and "implementations" are interchangeable words that are non-limiting examples of devices or methods employing one or more of the implementations or embodiments disclosed herein. It is apparent, however, that various embodiments may be practiced without these details or with one or more equivalent arrangements. In other instances, structures and devices may be shown in block diagram form to avoid unnecessarily obscuring various embodiments. Further, various embodiments may be different, but do not have to be exclusive. For example, shapes, configurations, and characteristics of an embodiment may be used or implemented in another embodiment without departing from the scope of the inventive concepts.

Unless otherwise specified, the illustrated embodiments are to be understood as providing features of varying detail of some or a number of ways in which the present inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the present inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be substantially perpendicular to one another, or may represent different directions that may not be perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

The terms "and" and "or" may be used in the conjunctive or disjunctive sense and may be understood to be equivalent to "and/or."

Although the terms "first," "second," etc. may be used herein to describe various types of elements, these elements should not be limited by these terms. These terms are used to distinguish one element from another element. Thus, a first element discussed below could be termed a second element without departing from the teachings of the present inventive concepts.

Spatially relative terms, such as "beneath," "below," "under," "lower," "above," "upper," "over," "higher," "side" (for example, as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or about 90 degrees or at other orientations), and, as such, the spatially relative descriptors used herein interpreted accordingly.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In an embodiment in which a third element intervenes between the first and second element, the first and second element may be understood as being indirectly opposed to one another, although still facing each other.

The terminology used herein is for the purpose of describing embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," "has," and/or "having," and/or variations thereof when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

For example, "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

Various embodiments are described herein with reference to cross-sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Some or a number of embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some or a number of functions and a processor (for example, one or more programmed microprocessors and associated circuitry) to perform other functions. Also, each block, unit, and/or module of some or a number of embodiments may be physically separated into two or more interacting and discrete blocks, units, and/or modules without departing from the scope of the present inventive concepts. Further, the blocks, units, and/or modules of some or a number of embodiments may be physically combined into more complex blocks, units, and/or modules without departing from the scope of the present inventive concepts.

Unless otherwise defined, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view showing a display device according to an embodiment of the present inventive concepts.

Referring to FIG. 1, a display device 10 may be applied to portable electronic devices such as a mobile phone, a smartphone, a tablet personal computer, a mobile communication terminal, an electronic organizer, an electronic book, a portable multimedia player (PMP), a navigation system, an ultra mobile PC (UMPC) or the like. The display device 10 may also be applied as a display unit of a television, a laptop, a monitor, a billboard, or an Internet-of-Things (IoT) device. As another example, the display device 10 may be applied to wearable devices such as a smart watch, a watch phone, a glasses type display, or a head mounted display (HMD). As yet another example, the display device 10 may be applied to a dashboard of a vehicle, a center fascia of a vehicle, a center information display (CID) disposed on a dashboard of a vehicle, a room mirror display in place of side mirrors of a vehicle, or a display disposed on a rear surface of a front seat for rear seat entertainment of a vehicle. However, embodiments of the present inventive concepts are not limited thereto and the display device 10 may be applied to various other small, medium or large sized electronic devices.

A direction parallel to the X-axis (hereinafter, the "X direction") may be a relatively shorter side direction of the display device 10, for example, a horizontal direction of the display device 10. A direction parallel to the Y-axis (hereinafter, the "Y direction") may be a relatively longer side direction of the display device 10, for example, a vertical direction of the display device 10. A direction parallel to the Z-axis (hereinafter, the "Z direction") may be a thickness direction of the display device 10.

The display device 10 may have a planar shape similar to a quadrilateral shape. For example, the display device 10 may have a shape similar to a quadrilateral shape, in plan view, having relatively shorter sides in the X direction and relatively longer sides in the Y direction. The corner where a relatively shorter side in the X direction and a relatively longer side in the Y direction meet may be rounded to have a predetermined curvature or may be right-angled. However, the planar shape of the display device 10 is not limited to a quadrilateral shape, and may be formed in a shape similar to another polygonal shape, a circular shape, or elliptical shape.

The display device 10 may include a display panel 100, a display driver 200, a circuit board 300, and a touch driver 400.

The display panel 100 may include a main region MA and a sub-region SBA.

The main region MA may include a display area DA including pixels displaying an image and a non-display area NDA disposed around the display area DA. For example, in an embodiment, the non-display area NDA may completely surround the display area DA (e.g., in the X and Y directions). However, embodiments of the present inventive concepts are not limited thereto. For example, the display area DA may extend to at least one edge of the display device and the non-display area NDA may not be disposed on at least one side of the display area DA. The display area DA may emit light from a plurality of light emitting areas or a plurality of opening areas. For example, in an embodiment, the display panel 100 may include a pixel circuit including switching elements, a pixel defining layer defining a light emitting area or an opening area, and a self-light emitting element.

For example, the self-light emitting element may include at least one of an organic light emitting diode including an organic light emitting layer, a quantum dot light emitting diode including a quantum dot light emitting layer, or an inorganic light emitting diode including an inorganic semiconductor. However, embodiments of the present inventive concepts are not limited thereto.

The non-display area NDA may be an area outside the display area DA. The non-display area NDA may be defined as an edge area of the main region MA of the display panel 100. In an embodiment, the non-display area NDA may include a gate driver that supplies gate signals to the gate lines, and fan-out lines that connect the display driver 200 to the display area DA.

The sub-region SBA may extend from one side of the main region MA. For example, as shown in the embodiment of FIG. 1, the sub-region SBA may extend from a lower side of the main region MA (e.g., in the Y direction). However, embodiments of the present inventive concepts are not limited thereto. In an embodiment, the sub-region SBA may include a flexible material capable of bending, folding, rolling, or the like. For example, when the sub-region SBA is bent, the sub-region SBA may overlap the main region MA (e.g., in the Z direction). In an embodiment, the sub-region SBA may include a display driver 200 and a pad unit connected to a circuit board 300.

The display driver 200 may output signals and voltages for driving the display panel 100. The display driver 200 may supply data voltages to data lines. The display driver 200 may supply a power voltage to the power line and may supply gate control signals to the gate driver. In an embodiment, the display driver 200 may be formed as an integrated circuit (IC) and mounted on the display panel 100 by a chip on glass (COG) method, a chip on plastic (COP) method, or an ultrasonic bonding method. For example, the display driver 200 may be disposed in the sub-region SBA, and may overlap the main region MA in the Z direction by bending of the sub-region SBA. However, embodiments of the present inventive concepts are not limited thereto. For example, the display driver 200 may be mounted on the circuit board 300.

In an embodiment, the circuit board 300 may be attached to the pad unit of the display panel 100 by using an anisotropic conductive film (ACF). Lead lines of the circuit board 300 may be electrically connected to a pad unit of the display panel 100. In an embodiment, the circuit board 300 may be a flexible printed circuit board, a printed circuit board, or a flexible film such as a chip on film. However, embodiments of the present inventive concepts are not limited thereto.

As shown in the embodiment of FIG. 1, a touch driver 400 may be mounted on the circuit board 300. The touch driver 400 may be connected to a touch sensing unit of the display panel 100. In an embodiment, the touch driver 400 may supply a touch driving signal to a plurality of touch electrodes of the touch sensing unit and may sense an amount of change in capacitance between the plurality of touch electrodes. For example, the touch driving signal may be a signal having a plurality of driving pulses. The touch driver 400 may determine whether a touch is inputted and calculate touch coordinates based on an amount of change in capacitance between the plurality of touch electrodes. In an embodiment, the touch driver 400 may be formed of an integrated circuit (IC).

Figure 2:
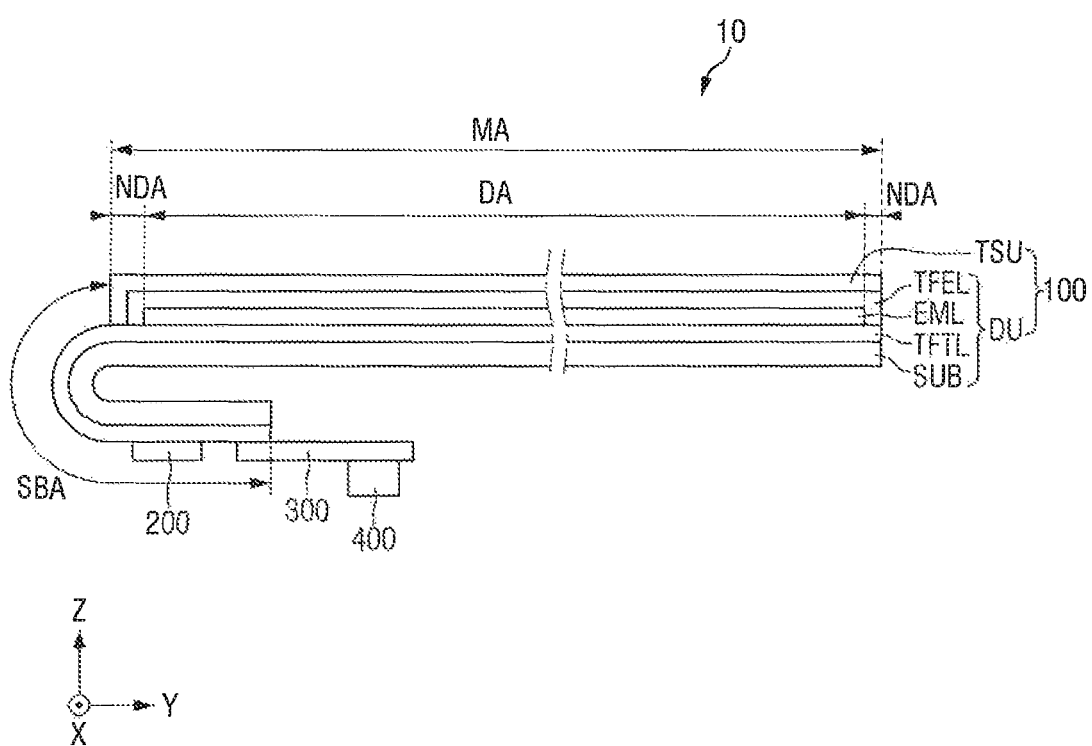
FIG. 2 is a cross-sectional view illustrating a display device according to an embodiment of the present inventive concepts.

FIG. 2 is a cross-sectional view illustrating a display device according to an embodiment of the present inventive concepts.

Referring to the embodiment of FIG. 2, the display panel 100 may include a display unit DU and a touch sensing unit TSU. The display unit DU may include a substrate SUB, a thin film transistor layer TFTL, a light emitting element layer EML, and an encapsulation layer TFEL.

In an embodiment, the substrate SUB may be a base substrate or a base member, and may be made of an insulating material such as a polymer resin. For example, the substrate SUB may be a flexible substrate which can be bent, folded and rolled. When the substrate SUB is a flexible substrate, the substrate SUB may be formed of polyimide (PI). However, embodiments of the present inventive concepts are not limited thereto.

The thin film transistor layer TFTL may be disposed on the substrate SUB (e.g., directly thereon). The thin film transistor layer TFTL may include a plurality of thin film transistors constituting a pixel circuit of pixels. The thin film transistor layer TFTL may further include gate lines, data lines, power lines, gate control lines, fan-out lines that connect the display driver 200 to the data lines, pad connection lines that connect the display driver 200 to the pad unit, and the like. Each of the thin film transistors may include a semiconductor region, a source electrode, a drain electrode, and a gate electrode. For example, in an embodiment in which the gate driver is formed on one side of the non-display area NDA of the display panel 100, the gate driver may include thin film transistors.

In an embodiment, the thin film transistor layer TFTL may be disposed in the display area DA, the non-display area NDA, and the sub-region SBA. Thin film transistors, gate lines, data lines, and power lines of each of the pixels of the thin film transistor layer TFTL may be disposed in the display area DA. Gate control lines and fan-out lines of the thin film transistor layer TFTL may be disposed in the non-display area NDA. Pad connection lines of the thin film transistor layer TFTL may be disposed in the sub-region SBA.

The light emitting element layer EML may be disposed on the thin film transistor layer TFTL (e.g., directly thereon in the Z direction). In an embodiment, the light emitting element layer EML may include a plurality of light emitting elements in which a first electrode, a light emitting layer, and a second electrode are sequentially stacked to emit light, and a pixel defining layer is disposed on the first electrode to define pixels. A plurality of light emitting elements of the light emitting element layer EML may be disposed in the display area DA.

For example, in an embodiment, the light emitting layer may be an organic light emitting layer including an organic material. The light emitting layer may include a hole transporting layer, an organic light emitting layer, and an electron transporting layer. When the first electrode is applied with a predetermined voltage through the thin film transistor of the thin film transistor layer TFTL and the second electrode is applied with the cathode voltage, holes and electrons may be transferred to the organic light emitting layer through the hole transporting layer and the electron transporting layer, respectively and may be combined with each other to emit light in the organic light emitting layer. For example, in an embodiment, the first electrode may be an anode electrode, and the second electrode may be a cathode electrode. However, embodiments of the present inventive concepts are not limited thereto.

In an embodiment, the light emitting element layer EML may include a quantum dot light emitting diode including a quantum dot light emitting layer or an inorganic light emitting diode including an inorganic semiconductor.

The encapsulation layer TFEL may cover the top surface and the side surface of the light emitting element layer EML, and may protect the light emitting element layer EML. In an embodiment, the encapsulation layer TFEL may include at least one inorganic layer and at least one organic layer for encapsulating the light emitting element layer EML.

The touch sensing unit TSU may be disposed on the encapsulation layer TFEL (e.g., directly thereon in the Z direction). The touch sensing unit TSU may include a plurality of touch electrodes for sensing a user's touch in a capacitive manner, and sensing lines connecting the plurality of touch electrodes to the touch driver 400. For example, in an embodiment, the touch sensing unit TSU may sense a user's touch by a self-capacitance method or a mutual capacitance method. However, embodiments of the present inventive concepts are not limited thereto.

For example, in an embodiment, the touch sensing unit TSU may be disposed on a separate substrate disposed on the display unit DU. In this embodiment, the substrate supporting the touch sensing unit TSU may be a base member that encapsulates the display unit DU.

In an embodiment, the plurality of touch electrodes of the touch sensing unit TSU may be disposed in a touch sensor area overlapping the display area DA. The sensing lines of the touch sensing unit TSU may be disposed in a touch peripheral area that overlaps the non-display area NDA.

For example, a polarizing film and a cover window may be additionally disposed on the touch sensing unit TSU. In an embodiment, the polarizing film may be disposed on the touch sensing unit TSU, and the cover window may be disposed on the polarizing film by an adhesive member. However, embodiments of the present inventive concepts are not limited thereto.

The sub-region SBA of the display panel 100 may extend from one side of the main region MA. The sub-region SBA may include a flexible material which can be bent, folded or rolled. For example, when the sub-region SBA is bent, the sub-region SBA may overlap the main region MA in the Z direction. The sub-region SBA may include the display driver 200 and the pad unit connected to the circuit board 300.

Figure 3:
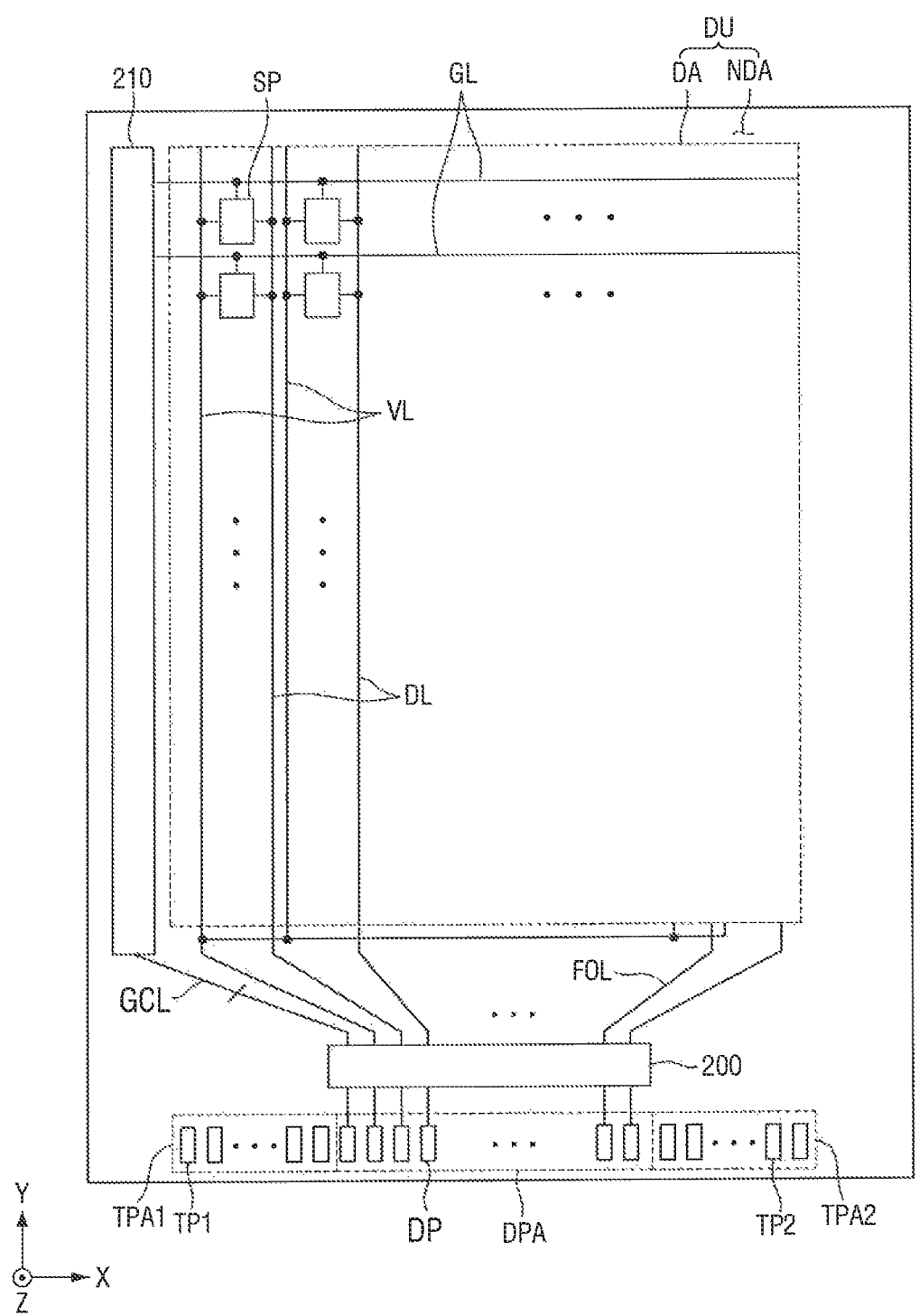
FIG. 3 is a plan view illustrating a display unit of a display device according to an embodiment of the present inventive concepts.

FIG. 3 is a plan view illustrating a display unit of a display device according to an embodiment of the present inventive concepts.

Referring to the embodiment of FIG. 3, the display unit DU may include the display area DA and the non-display area NDA.

In an embodiment, the display area DA, which is an area for displaying an image, may be defined as the central area (e.g., in the X and Y directions) of the display panel 300. However, embodiments of the present inventive concepts are not limited thereto. The display area DA may include a plurality of pixels SP arranged in the X and Y directions, and a plurality of gate lines GL, a plurality of data lines DL, and a plurality of power supply lines VL connected to the plurality of pixels SP. Each of the plurality of pixels SP may be defined as an area of the smallest unit that outputs light.

The plurality of gate lines GL may supply the gate signals received from the gate driver 210 to the plurality of pixels SP. The plurality of gate lines GL may extend substantially longitudinally in the X direction and may be spaced apart from each other in the Y direction intersecting the X direction.

The plurality of data lines DL may supply the data voltages received from the display driver 200 to the plurality of pixels SP. The plurality of data lines DL may extend substantially longitudinally in the Y direction and may be spaced apart from each other in the X direction.

The power supply lines VL may provide power supply voltages from the display driver 200 to the pixels SP. Here, the power supply voltages may include at least one of a driving voltage, an initialization voltage, and a reference voltage. The power supply lines VL may extend in the Y direction and may be spaced apart from one another in the X direction.

The non-display area NDA may surround the display area DA (e.g., in the X and Y directions). For example, the non-display area NDA may include a gate driver 210 that applies gate signals to the plurality of gate lines GL, fan-out lines FOL that connect the data lines DL to the display driver 200, and a display pad unit DP connected to the circuit board 300.

The display driver 200 may output signals and voltages for driving the display panel 100. The display driver 200 may supply a data voltage to the data lines DL. The data voltage may be supplied to the plurality of pixels SP through the data lines DL to determine the luminance of the plurality of pixels SP.

The display driver 200 may supply a gate control signal to the gate driver 210 through a gate control line GCL. The gate driver 210 may generate a plurality of gate signals based on the gate control signal, and may sequentially supply the plurality of gate signals to the plurality of gate lines GL according to a set order.

A display pad area DPA, a first touch pad area TPA1, and a second touch pad area TPA2 may be disposed at the edge of the display panel 100. For example, as shown in the embodiment of FIG. 3, the display pad area DPA, the first touch pad area TPA1 and the second touch pad area TPA2 may be disposed on a bottom portion of the non-display area (e.g., in the Y direction). However, embodiments of the present inventive concepts are not limited thereto. In an embodiment, the display pad area DPA, the first touch pad area TPA1, and the second touch pad area TPA2 may be electrically connected to the circuit board 300 by using an anisotropic conductive film or a low-resistance high-reliability material such as SAP.

The display pad area DPA may include a plurality of display pad units DP. The plurality of display pad units DP may be connected to the main processor through the circuit board 300. In an embodiment, the plurality of display pad units DP may be arranged in the X direction. The plurality of display pad units DP may be connected to the circuit board 300 to receive digital video data including at least one moving and/or still image, and may supply the digital video data to the display driver 200.

Figure 4:
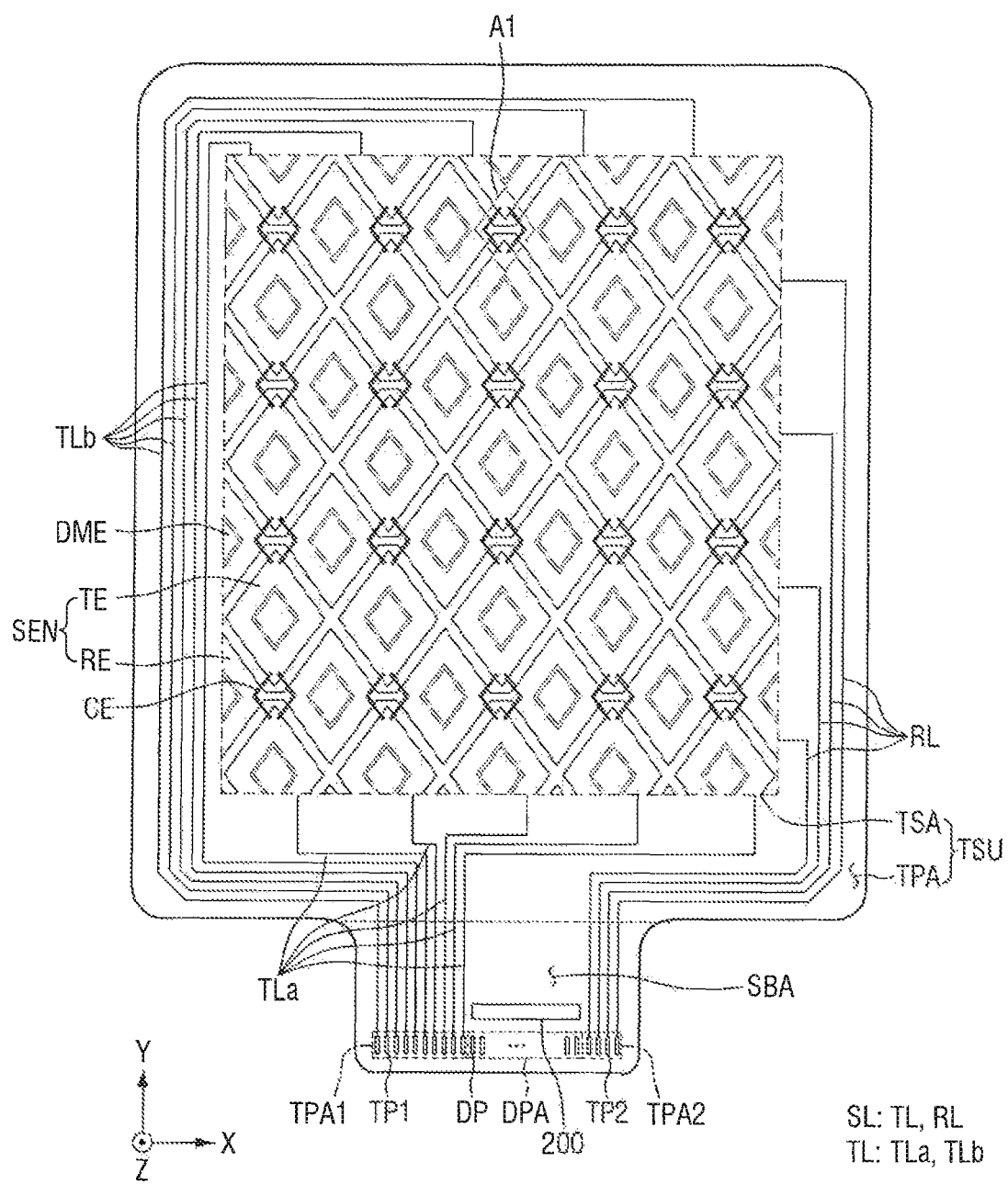
FIG. 4 is a plan view illustrating a touch sensing unit of a display device according to an embodiment of the present inventive concepts.

FIG. 4 is a plan view illustrating a touch sensing unit of a display device according to an embodiment of the present inventive concepts.

Referring to the embodiment of FIG. 4, the touch sensing unit TSU may include a touch sensor area TSA for sensing a user's touch, and a touch peripheral area TPA disposed around the touch sensor area TSA (e.g., in the X and Y directions). The touch sensor area TSA may overlap the display area DA of the display panel 100 (e.g., in the Z direction), and the touch peripheral area TPA may overlap the non-display area NDA of the display panel 100 (e.g., in the Z direction).

The touch sensor area TSA may include a plurality of touch electrodes SEN and a plurality of dummy electrodes DME. The plurality of touch electrodes SEN may form mutual capacitance or self-capacitance to sense a touch of an object or person. The plurality of touch electrodes SEN may include a plurality of driving electrodes TE and a plurality of sensing electrodes RE.

The plurality of driving electrodes TE may be arranged in the X direction and the Y direction. For example, the plurality of driving electrodes TE may be spaced apart from each other in the X direction and the Y direction. The driving electrodes TE adjacent in the Y direction may be electrically connected through a bridge electrode CE.

The plurality of driving electrodes TE may be connected to the first touch pad unit TP1 through a driving line TL. The driving line TL may include a lower driving line TLa and an upper driving line TLb. For example, at least some of the driving electrodes TE disposed on a lower side of the touch sensor area TSA (e.g., in the Y direction) may be connected to the first touch pad unit TP1 through the lower driving line TLa, and at least some of the driving electrodes TE disposed on the upper side of the touch sensor area TSA (e.g., in the Y direction) may be connected to the first touch pad unit TP1 through the upper driving line TLb. The lower driving line TLa may extend to the first touch pad unit TP1 through the lower side (e.g., in the Y direction) of the touch peripheral area TPA. The upper driving line TLb may extend to the first touch pad unit TP1 through the upper side, the left side, and the lower side of the touch peripheral area TPA. The first touch pad unit TP1 may be connected to the touch driver 400 through the circuit board 300.

The bridge electrode CE may be bent at least once. For example, in an embodiment, the bridge electrode CE may have a bracket shape ("<" or ">"). However, embodiments of the present inventive concepts are not limited thereto and the planar shape (e.g., in a plane defined in the X and Y directions) of the bridge electrode CE may vary. The driving electrodes TE adjacent to each other in the Y direction may be connected by a plurality of bridge electrodes CE, and even in an instance in which any one of the bridge electrodes CE is disconnected, the driving electrodes TE may be stably connected through the remaining bridge electrode CE. The driving electrodes TE adjacent to each other may be connected by two bridge electrodes CE. However, embodiments of the present inventive concepts are not limited thereto. and the number of bridge electrodes CE may vary.

In an embodiment, the bridge electrode CE may be disposed on a different layer from the plurality of driving electrodes TE and the plurality of sensing electrodes RE. For example, in an embodiment, the sensing electrodes RE adjacent to each other in the X direction may be electrically connected through a connection portion disposed on the same layer as the plurality of driving electrodes TE or the plurality of sensing electrodes RE, and the driving electrodes TE adjacent in the Y direction may be electrically connected through the bridge electrode CE disposed on a different layer from the plurality of driving electrodes TE or the plurality of sensing electrodes RE. Accordingly, although the bridge electrode CE overlaps the plurality of sensing electrodes RE in the Z direction, the plurality of driving electrodes TE and the plurality of sensing electrodes RE may be insulated from each other. Mutual capacitance may be formed between the driving electrode TE and the sensing electrode RE.

In an embodiment, the plurality of sensing electrodes RE may extend in the X direction and may be spaced apart from each other in the Y direction. The plurality of sensing electrodes RE may be arranged in the X direction and the second direction (Y-axis direction), and the sensing electrodes RE adjacent in the X direction may be electrically connected through the connection portion.

The plurality of sensing electrodes RE may be connected to the second touch pad unit TP2 through a sensing line RL. For example, in an embodiment, some of the sensing electrodes RE disposed on the right side of the touch sensor area TSA may be connected to the second touch pad unit TP2 through the sensing line RL. The sensing line RL may extend to the second touch pad unit TP2 through the right side and the lower side of the touch peripheral area TPA. The second touch pad unit TP2 may be connected to the touch driver 400 through the circuit board 300. The driving line TL and the sensing line RL may form signal lines SL of the display device.

Each of the plurality of dummy electrodes DME may be surrounded by the driving electrode TE or the sensing electrode RE. Each of the dummy electrodes DME may be insulated by being spaced apart from the driving electrode TE or the sensing electrode RE. Accordingly, the dummy electrode DME may be electrically floating.

Figure 5:
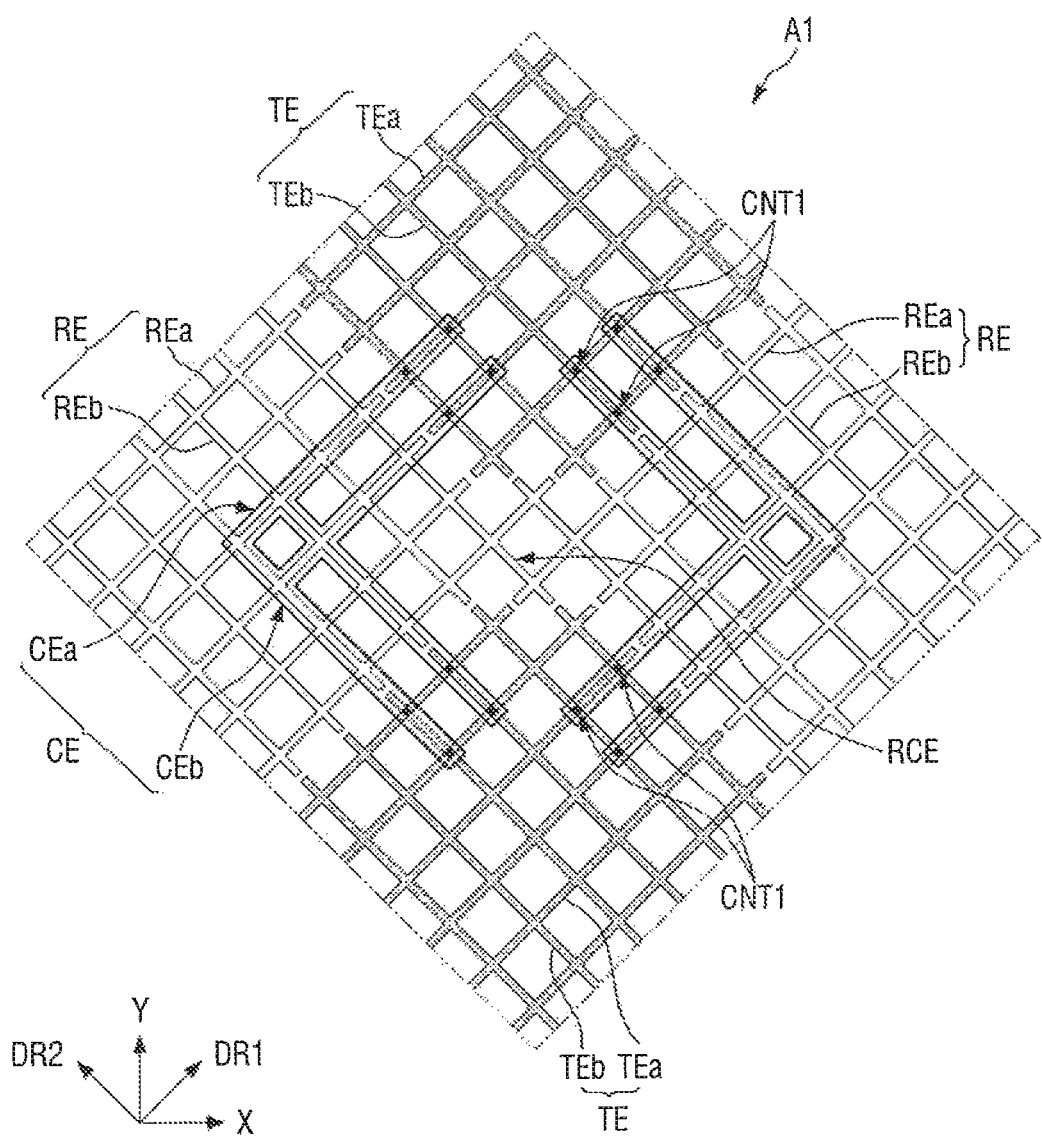
FIG. 5 is an enlarged view of area μl of FIG. 4 according to an embodiment of the present inventive concepts.

The display pad area DPA, the first touch pad area TPA1, and the second touch pad area TPA2 may be disposed at the edge of the sub-region SBA of the display panel 100. For example, as shown in the embodiment of FIG. 5, the display pad area DPA, the first touch pad area TPA1, and the second touch pad area TPA2 may be disposed at a lower edge of the sub-region SBA (e.g., in the Y direction). In an embodiment, the display pad area DPA, the first touch pad area TPA1, and the second touch pad area TPA2 may be electrically connected to the circuit board 300 by using an anisotropic conductive film or a low-reliability high-reliability material such as SAP.

The first touch pad area TPA1 may be disposed on one side of the display pad area DPA, and may include a plurality of first touch pad units TPL. For example, in an embodiment, the first touch pad area TPA1 may be disposed on a left side of the display pad area DPA (e.g., in the X direction). The plurality of first touch pad units TP1 may be electrically connected to the touch driver 400 disposed on the circuit board 300. The plurality of first touch pad units TP1 may supply a touch driving signal to the plurality of driving electrodes TE through the plurality of lower driving lines TLa.

The second touch pad area TPA2 may be disposed on the other side of the display pad area DPA, and may include a plurality of second touch pad units TP2. For example, in an embodiment, the second touch pad area TPA2 may be disposed on a right side of the display pad area DPA (e.g., in the X direction) The plurality of second touch pad units TP2 may be electrically connected to the touch driver 400 disposed on the circuit board 300. The touch driver 400 may receive a touch sensing signal through a plurality of sensing lines RL connected to the plurality of second touch pad units TP2, and may sense a change in mutual capacitance between the driving electrode TE and the sensing electrode RE. In an embodiment, each of the plurality of sensing lines may be connected to a plurality of sensing electrodes arranged in the X direction. However, embodiments of the present inventive concepts are not limited thereto.

For example, in an embodiment, the touch driver 400 may supply a touch driving signal to each of the plurality of driving electrodes TE and the plurality of sensing electrodes RE, and may receive a touch sensing signal from each of the plurality of driving electrodes TE and the plurality of sensing electrodes RE. The touch driver 400 may sense an amount of change in electric charge of each of the plurality of driving electrodes TE and the plurality of sensing electrodes RE based on the touch sensing signal.

Figure 6:
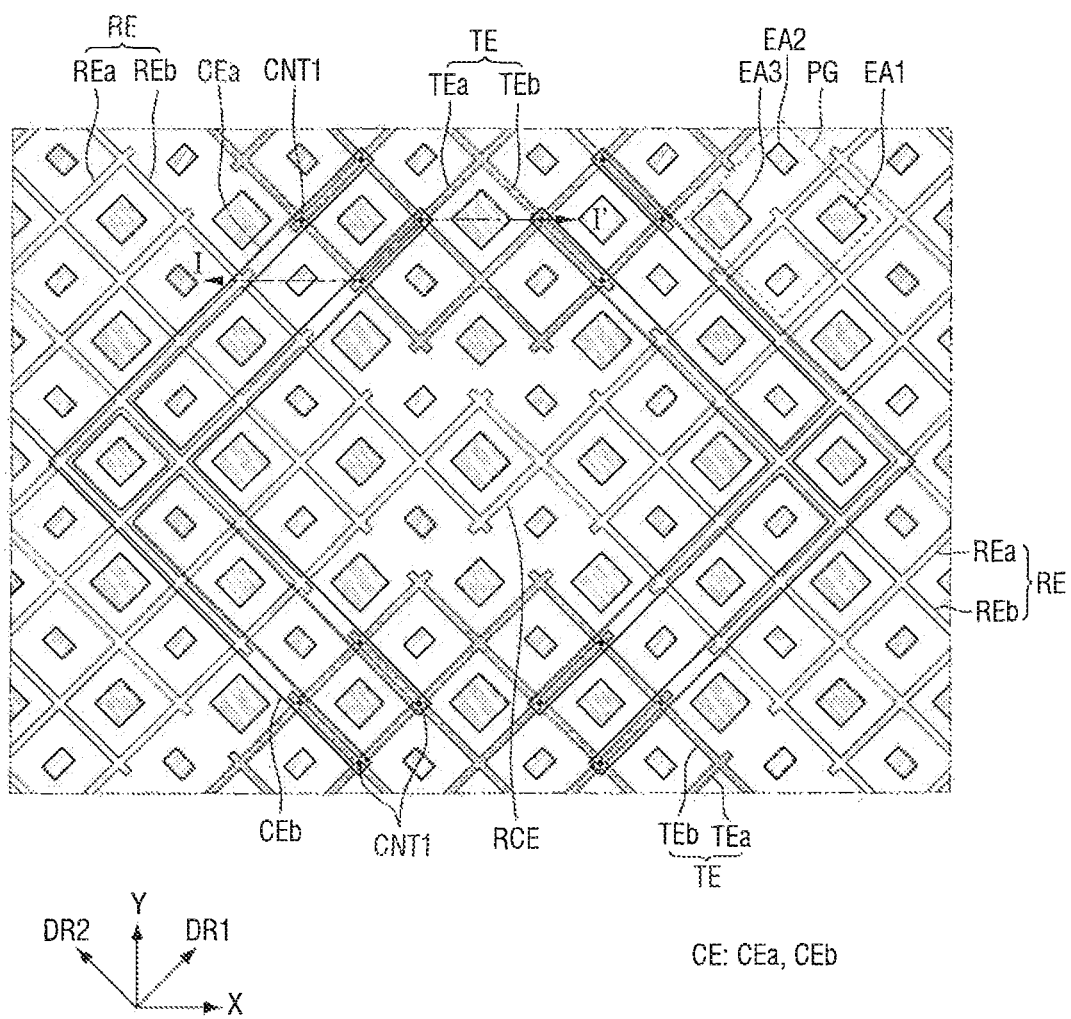
FIG. 6 is an enlarged view illustrating a part of a display device according to an embodiment of the present inventive concepts.

FIG. 5 is an enlarged view of area μl of FIG. 4 according to an embodiment of the present inventive concepts, and FIG. 6 is an enlarged view illustrating a part of a display device according to an embodiment of the present inventive concepts.

Referring to the embodiments of FIGS. 5 and 6, the plurality of driving electrodes TE, the plurality of sensing electrodes RE, and the plurality of dummy electrodes DME may be disposed on the same layer and may be spaced apart from each other.

The plurality of driving electrodes TE may be arranged in the X direction and the Y direction. The plurality of driving electrodes TE may be spaced apart from each other in the X direction and the Y direction. The driving electrodes TE adjacent in the Y direction may be electrically connected through a bridge electrode CE.

The plurality of sensing electrodes RE may extend in the X direction and may be spaced apart from each other in the Y direction. The plurality of sensing electrodes RE may be arranged in the X direction and the Y direction, and the sensing electrodes RE adjacent in the X direction may be electrically connected through a connection portion RCE. For example, the connection portion RCE of the sensing electrodes RE may be disposed within the shortest distance between the driving electrodes TE adjacent to each other (e.g., in the Y direction).

The plurality of bridge electrodes CE may be disposed on a different layer from the driving electrode TE and the sensing electrode RE. The bridge electrode CE may include a first portion CEa and a second portion CEb. For example, the second portion CEb of the bridge electrode CE may be connected to the driving electrode TE disposed on one side (e.g., a lower side in the Y direction) through a first contact hole CNT1 and may extend in a second direction DR2. The first portion CEa of the bridge electrode CE may be bent from the second portion CEb in an area overlapping the sensing electrode RE to extend in a first direction DR1, and may be connected to the driving electrode TE disposed on the other side (e.g., an upper side in the Y direction) through the first contact hole CNT1. Hereinafter, the first direction DR1 may be a direction between the X direction and the Y direction, and the second direction DR2 may be a direction crossing the first direction DR1. For example, in an embodiment, the second direction DR2 may be perpendicular to the first direction DR1. However, embodiments of the present inventive concepts are not limited thereto. Accordingly, each of the plurality of bridge electrodes CE may connect the adjacent driving electrodes TE in the Y direction.

For example, in an embodiment, the plurality of driving electrodes TE, the plurality of sensing electrodes RE, and the plurality of dummy electrodes DME (FIG. 4) may be formed in a planar mesh structure or a mesh structure. Accordingly, as shown in FIG. 6, the plurality of driving electrodes TE, the plurality of sensing electrodes RE, and the plurality of dummy electrodes DME may not overlap first to third light emitting areas EA1, EA2, and EA3 of a pixel group PG (e.g., in the Z direction). The plurality of bridge electrodes CE may also not overlap the first to third light emitting areas EA1, EA2, and EA3 (e.g., in the Z direction). Accordingly, the display device 10 may prevent the luminance of light emitted from the first to third light emitting areas EA1, EA2, and EA3 from being reduced by the touch sensing unit TSU.

Each of the plurality of driving electrodes TE may include a first portion TEa extending in the first direction DR1 and a second portion TEb extending in the second direction DR2. Each of the plurality of sensing electrodes RE may include a first portion REa extending in the first direction DR1 and a second portion REb extending in the second direction DR2. However, embodiments of the present inventive concepts are not limited thereto.

For example, the plurality of driving electrodes TE, the plurality of sensing electrodes RE, and the plurality of dummy electrodes DME may be formed in a full surface structure rather than a planar mesh structure or a mesh structure. In this embodiment, the plurality of driving electrodes TE, the plurality of sensing electrodes RE, and the plurality of dummy electrodes DME may include a transparent conductive material having high light transmittance such as ITO and IZO, and may prevent the luminance of light emitted from the first to third light emitting areas EA1, EA2, and EA3 from being reduced.

In an embodiment, the plurality of pixels may include first to third sub-pixels, and each of the first to third sub-pixels may include the first to third light emitting areas EA1, EA2, and EA3. For example, in an embodiment, the first light emitting area EA1 may emit light of a first color or red light, the second light emitting area EA2 may emit light of a second color or green light, and the third light emitting area EA3 may emit light of a third color or blue light. However, embodiments of the present inventive concepts are not limited thereto and the number of sub-pixels and the colors they emit may vary.

In an embodiment, one pixel group PG may represent white gray scale by including one first light emitting area EA1, two second light emitting areas EA2, and one third light emitting area EA3. Accordingly, the white gray scale may be represented by a combination of light emitted from one first light emitting area EA1, light emitted from two second light emitting areas EA2, and light emitted from one third light emitting area EA3.

Figure 7:
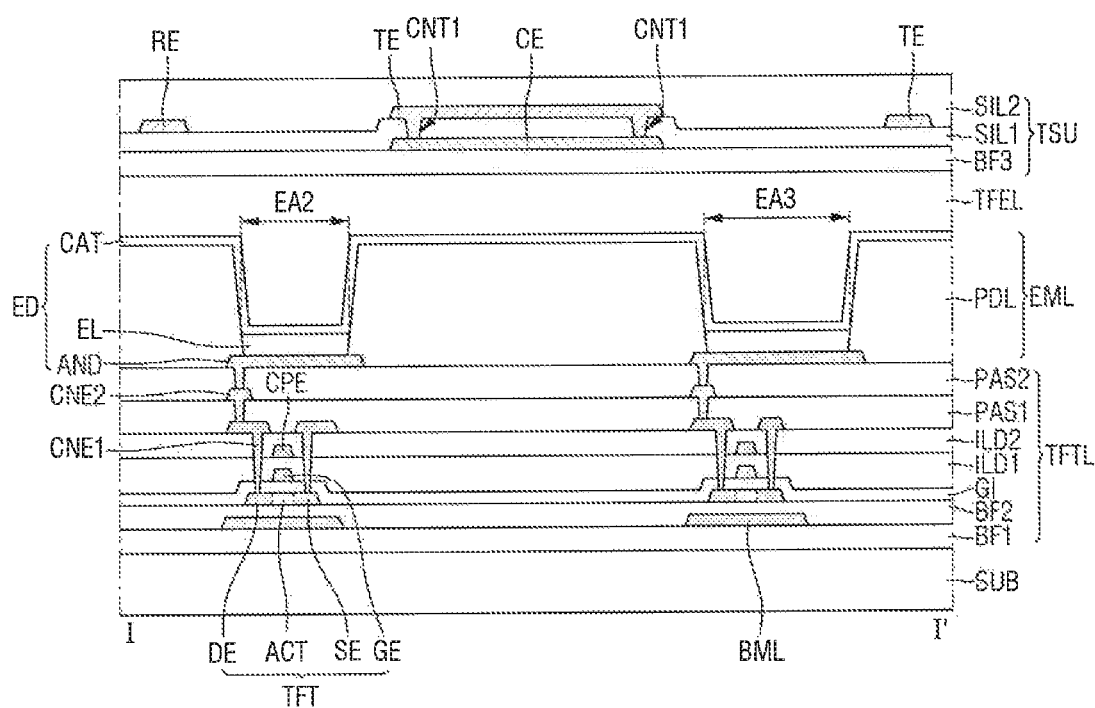
FIG. 7 is a cross-sectional view taken along line I-I' of FIG. 6 according to an embodiment of the present inventive concepts.

FIG. 7 is a cross-sectional view taken along line I-I' of FIG. 6.

Referring to the embodiment of FIG. 7, the display panel 100 may include the display unit DU and the touch sensing unit TSU. The display unit DU may include the substrate SUB, the thin film transistor layer TFTL, the light emitting element layer EML, and the encapsulation layer TFEL.

The substrate SUB may support the display panel 100. In an embodiment, the substrate SUB may be a base substrate or a base member, and may be made of an insulating material such as a polymer resin. For example, the substrate SUB may be a flexible substrate which can be bent, folded and rolled. However, embodiments of the present inventive concepts are not limited thereto. For example, the substrate SUB may include a flexible material and a rigid material.

The thin film transistor layer TFTL may include first and second buffer layers BF1 and BF2, a thin film transistor TFT, a gate insulating layer GI, a first interlayer insulating layer ILD1, a capacitor electrode CPE, a second interlayer insulating layer ILD2, a first connection electrode CNE1, a first protective layer PAS1, a second connection electrode CNE2, and a second protective layer PAS2.

The first buffer layer BF1 may be disposed on the substrate SUB (e.g., directly thereon in the Z direction). In an embodiment, the first buffer layer BF1 may include an inorganic layer capable of preventing penetration of air or moisture. For example, the first buffer layer BF1 may include a plurality of inorganic layers alternately stacked.

A light blocking layer BML may be disposed on the first buffer layer BF1 (e.g., directly thereon in the Z direction). For example, in an embodiment, the light blocking layer BML may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof. However, embodiments of the present inventive concepts are not limited thereto. For example, the light blocking layer BML may be an organic layer including a black pigment.

The second buffer layer BF2 may cover the first buffer layer BF1 and the light blocking layer BML. The second buffer layer BF2 may include an inorganic layer capable of preventing penetration of air or moisture. For example, in an embodiment, the second buffer layer BF2 may include a plurality of inorganic layers alternately stacked.

The thin film transistor TFT may be disposed on the second buffer layer BF2 (e.g., directly thereon), and may constitute a pixel circuit of each of a plurality of pixels. For example, in an embodiment, the thin film transistor TFT may be a switching transistor or a driving transistor of the pixel circuit. As shown in the embodiment of FIG. 7, the thin film transistor TFT may include a semiconductor region ACT, a gate electrode GE, a source electrode SE, and a drain electrode DE.

The semiconductor region ACT, the source electrode SE, and the drain electrode DE may be disposed on the second buffer layer BF2. The source electrode SE and the drain electrode DE may be disposed on opposite lateral sides of the semiconductor region ACT. The semiconductor region ACT may overlap the gate electrode GE in the thickness direction (e.g., the Z direction), and may be insulated from the gate electrode GE by the gate insulating layer GI. In an embodiment, the source electrode SE and the drain electrode DE may be provided by making a material of the semiconductor region ACT conductive.

The gate electrode GE may be disposed on the gate insulating layer GI (e.g., directly thereon in the Z direction). The gate electrode GE may overlap the semiconductor region ACT with the gate insulating layer GI interposed therebetween.

The gate insulating layer GI may be disposed on the semiconductor region ACT, the source electrode SE, and the drain electrode DE (e.g., directly thereon in the Z direction). For example, the gate insulating layer GI may cover the semiconductor region ACT, the source electrode SE, the drain electrode DE, and the second buffer layer BF2, and may insulate the semiconductor region ACT from the gate electrode GE. The gate insulating layer GI may include a contact hole through which the first connection electrode CNE1 passes therethrough.

The first interlayer insulating layer ILD1 may cover the gate electrode GE and the gate insulating layer GI. The first interlayer insulating layer ILD1 may include a contact hole through which the first connection electrode CNE1 passes therethrough. The contact hole of the first interlayer insulating layer ILD1 may be connected to the contact hole of the gate insulating layer GI and the contact hole of the second interlayer insulating layer ILD2.

The capacitor electrode CPE may be disposed on the first interlayer insulating layer ILD1 (e.g., directly thereon in the Z direction). The capacitor electrode CPE may overlap the gate electrode GE in the Z direction.

The second interlayer insulating layer ILD2 may cover the capacitor electrode CPE and the first interlayer insulating layer ILD1. The second interlayer insulating layer ILD2 may include a contact hole through which the first connection electrode CNE1 passes therethrough. The contact hole of the second interlayer insulating layer ILD2 may be connected to the contact hole of the first interlayer insulating layer ILD1 and the contact hole of the gate insulating layer GI.

The first connection electrode CNE1 may be disposed on the second interlayer insulating layer ILD2 (e.g., directly thereon in the Z direction). The first connection electrode CNE1 may connect the drain electrode DE of the thin film transistor TFT to the second connection electrode CNE2. The first connection electrode CNE1 may extend through a contact hole provided in the second interlayer insulating layer ILD2, the first interlayer insulating layer ILD1, and the gate insulating layer GI to directly contact the drain electrode DE of the thin film transistor TFT.

The first protective layer PAS1 may cover the first connection electrode CNE1 and the second interlayer insulating layer ILD2. The first protective layer PAS1 may protect the thin film transistor TFT. The first protective layer PAS1 may include a contact hole through which the second connection electrode CNE2 passes therethrough.

The second connection electrode CNE2 may be disposed on the first protective layer PAS1 (e.g., directly thereon in the Z direction). The second connection electrode CNE2 may connect the first connection electrode CNE1 and a first electrode AND of the light emitting element ED. The second connection electrode CNE2 may extend through a contact hole provided in the first protective layer PAS1 to directly contact the first connection electrode CNE1.

The second protective layer PAS2 may cover the second connection electrode CNE2 and the first protective layer PAS1. The second protective layer PAS2 may include a contact hole through which the first electrode AND of the light emitting element ED passes therethrough.

The light emitting element layer EML may be disposed on the thin film transistor layer TFTL (e.g., directly thereon in the Z direction). The light emitting element layer EML may include the light emitting element ED and a pixel defining layer PDL. The light emitting element ED may include the first electrode AND, a light emitting layer EL, and a second electrode CAT.

The first electrode AND may be disposed on the second protective layer PAS2 (e.g., directly thereon in the Z direction). The first electrode AND may be disposed to overlap one of the first to third light emitting areas EA1, EA2, and EA3 defined by the pixel defining layer PDL. In an embodiment, the first electrode AND may be connected to the drain electrode DE of the thin film transistor TFT through the first and second connection electrodes CNE1 and CNE2.

The light emitting layer EL may be disposed on the first electrode AND. For example, in an embodiment, the light emitting layer EL may be an organic light emitting layer made of an organic material. However, embodiments of the present inventive concepts are not limited thereto. In an embodiment in which the light emitting layer EL is the organic light emitting layer, the thin film transistor TFT applies a predetermined voltage to the first electrode AND of the light emitting element ED, and if the second electrode CAT of the light emitting element ED receives a common voltage or a cathode voltage, the holes and electrons can move to the organic light emitting layer EL through the hole transport layer and the electron transport layer and combine to produce light to be emitted by the organic light emitting layer EL.

The second electrode CAT may be disposed on the light emitting layer EL. For example, in an embodiment, the second electrode CAT may extend over the entire substrate SUB and may be in the form of an electrode common to all of the pixels rather than specific to each of the pixels. For example, the second electrode CAT may be disposed on the light emitting layer EL in the first to third light emitting areas EA1, EA2, and EA3, and may be disposed on the pixel defining layer PDL in the remaining areas of the pixel defining layer PDL other than the first to third light emitting areas EA1, EA2, and EA3.

The pixel defining layer PDL may define the first to third light emitting areas EA1, EA2, and EA3. The pixel defining layer PDL may separate and insulate the first electrode AND of each of the plurality of light emitting elements ED. For example, as shown in the embodiment of FIG. 7, the pixel defining layer PDL may cover lateral ends of the first electrode AND and the lateral side walls of the light emitting layer EL disposed on the first electrode AND.

The encapsulation layer TFEL may be disposed on the second electrode CAT to cover the plurality of light emitting elements ED. In an embodiment, the encapsulation layer TFEL may include at least one inorganic layer to prevent oxygen or moisture from penetrating into the light emitting element layer EML. In an embodiment, the encapsulation layer TFEL may include at least one organic layer to protect the light emitting element layer EML from foreign matters such as dust.

The touch sensing unit TSU may be disposed on the encapsulation layer TFEL (e.g., directly thereon in the Z direction). The touch sensing unit TSU may include a third buffer layer BF3, the bridge electrode CE, a first insulating layer SIL1, the driving electrode TE, the sensing electrode RE, and a second insulating layer SIL2.

The third buffer layer BF3 may be disposed on the encapsulation layer TFEL (e.g., directly thereon in the Z direction). The third buffer layer BF3 may have an insulating and optical function. In an embodiment, the third buffer layer BF3 may include at least one inorganic layer. However, embodiments of the present inventive concepts are not limited thereto. For example, in an embodiment, the third buffer layer BF3 may be omitted.

The bridge electrode CE may be disposed on the third buffer layer BF3 (e.g., directly thereon in the Z direction). For example, as shown in the embodiment of FIG. 7, a lower surface of the bridge electrode CE may directly contact an upper surface of the third buffer layer BF3. The bridge electrode CE may be disposed on a different layer from the driving electrode TE and the sensing electrode RE, and may connect the adjacent driving electrodes TE in the Y direction. For example, in an embodiment, the bridge electrode CE may be formed of a single layer containing molybdenum (Mo), titanium (Ti), copper (Cu), or aluminum (Al), or may be formed to have a stacked structure (Ti/Al/Ti) of aluminum and titanium, a stacked structure (ITO/Al/ITO) of aluminum and indium tin oxide (ITO), an Ag—Pd—Cu (APC) alloy, or a stacked structure (ITO/APC/ITO) of APC alloy and ITO. However, embodiments of the present inventive concepts are not limited thereto and the material(s) of the bridge electrode CE may vary.

The first insulating layer SIL1 may cover the bridge electrode CE and the third buffer layer BF3. For example, as shown in the embodiment of FIG. 7, a lower surface of the first insulating layer SIL1 may directly contact an upper surface of the third buffer layer BF3 and an upper surface and lateral side surfaces of the bridge electrode CE. The first insulating layer SIL1 may have an insulating and optical function. For example, in an embodiment, the first insulating layer SIL1 may be formed of an inorganic layer, for example, a silicon nitride layer, a silicon oxynitride layer, a silicon oxide layer, a titanium oxide layer, or an aluminum oxide layer. However, embodiments of the present inventive concepts are not limited thereto and the material(s) of the third buffer layer BF3 may vary.

The driving electrode TE and the sensing electrode RE may be disposed on the first insulating layer SIL1 (e.g., directly thereon in the Z direction). For example, as shown in the embodiment of FIG. 7, lower surfaces of the driving electrode TE and the sensing electrode RE may directly contact an upper surface of the first insulating layer SIL1. The driving electrode TE and the sensing electrode RE are separated from the bridge electrode CE by the first insulating layer SIL1. As shown in the embodiment of FIG. 7, the driving electrode TE may be connected to the bridge electrode CE through first contact hole CNT1 in the first insulating layer SILL. Each of the driving electrode TE and the sensing electrode RE may not overlap (e.g., in the Z direction) the first to third light emitting areas EA1, EA2, and EA3. In an embodiment, each of the driving electrode TE and the sensing electrode RE may be formed of a single layer containing molybdenum (Mo), titanium (Ti), copper (Cu), or aluminum (Al), or may be formed to have a stacked structure (Ti/Al/Ti) of aluminum and titanium, a stacked structure (ITO/Al/ITO) of aluminum and indium tin oxide (ITO), an Ag—Pd—Cu (APC) alloy, or a stacked structure (ITO/APC/ITO) of APC alloy and ITO. However, embodiments of the present inventive concepts are not limited thereto.

The second insulating layer SIL2 may cover the driving electrode TE, the sensing electrode RE, and the first insulating layer SIL1. The second insulating layer SIL2 may have an insulating and optical function. In an embodiment, the second insulating layer SIL2 may be made of a same material as the first insulating layer SIL1.

Figure 8:
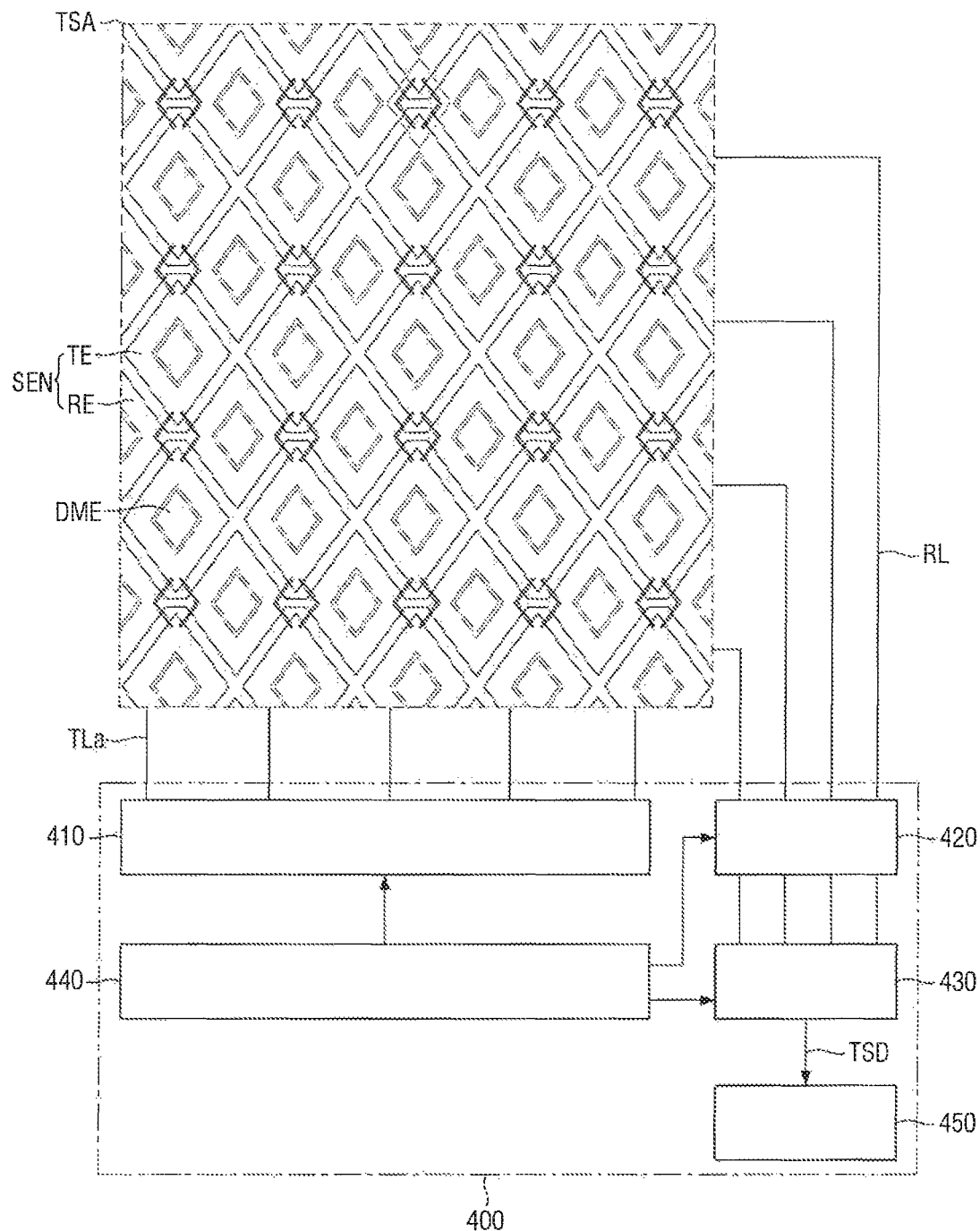
FIG. 8 is a block diagram illustrating a touch sensing unit and a touch driver in a display device according to an embodiment of the present inventive concepts.

FIG. 8 is a block diagram illustrating a touch sensing unit and a touch driver in a display device according to an embodiment of the present inventive concepts.

Referring to the embodiment of FIG. 8, the touch driver 400 may include a driving signal output unit 410, a sensing circuit unit 420, an analog-to-digital conversion unit 430, a touch control unit 440, and a touch data compensation unit 450.

The driving signal output unit 410 may be connected to the plurality of driving electrodes TE through the lower driving line TLa. The driving signal output unit 410 may supply a touch driving signal to the plurality of driving electrodes TE. The touch driving signal may be a signal having a plurality of driving pulses. In an embodiment, the driving signal output unit 410 may supply a touch driving signal to the lower driving line TLa based on a preset order. For example, the driving signal output unit 410 may sequentially output touch driving signals, from the driving electrodes TE disposed on a first side of the touch sensor area TSA to the driving electrodes TE disposed on the opposite second side of the touch sensor area TSA.

The sensing circuit unit 420 may be connected to the plurality of sensing electrodes RE through the sensing line RL. In an embodiment, the sensing circuit unit 420 may sense an amount of change in mutual capacitance between the plurality of driving electrodes TE and the plurality of sensing electrodes RE through the sensing line RL. However, embodiments of the present inventive concepts are not limited thereto.

For example, in an embodiment, the driving signal output unit 410 may supply a touch driving signal to the plurality of touch electrodes TE, and the sensing circuit unit 420 may supply a touch driving signal to the plurality of sensing electrodes RE. In this embodiment, the driving signal output unit 410 may sense an amount of change of electric charge of the plurality of touch electrodes TE, and the sensing circuit unit 420 may sense an amount of change of electric charge of the plurality of sensing electrodes RE. Accordingly, each of the driving signal output unit 410 and the sensing circuit unit 420 may sense an amount of change in self-capacitance formed in the plurality of touch electrodes TE and the plurality of sensing electrodes RE, respectively.

The analog-to-digital conversion unit 430 may convert the output voltage of the sensing circuit unit 420 into touch sensing data TSD that is digital data. In an embodiment, the analog-to-digital conversion unit 430 may supply the touch sensing data TSD to the touch data compensation unit 450.

The touch control unit 440 may control driving timings of the driving signal output unit 410, the sensing circuit unit 420, and the analog-to-digital conversion unit 430. The touch control unit 440 may output a timing signal for synchronization of the driving signal output unit 410, the sensing circuit unit 420, and the analog-to-digital conversion unit 430, to each of the driving signal output unit 410, the sensing circuit unit 420, and the analog-to-digital conversion unit 430.

The touch data compensation unit 450 may receive touch sensing data TD from the analog-to-digital conversion unit 430. The touch data compensation unit 450 may analyze the touch sensing data TD and may determine whether a user inputs a touch and calculate touch coordinates.

Figure 9:
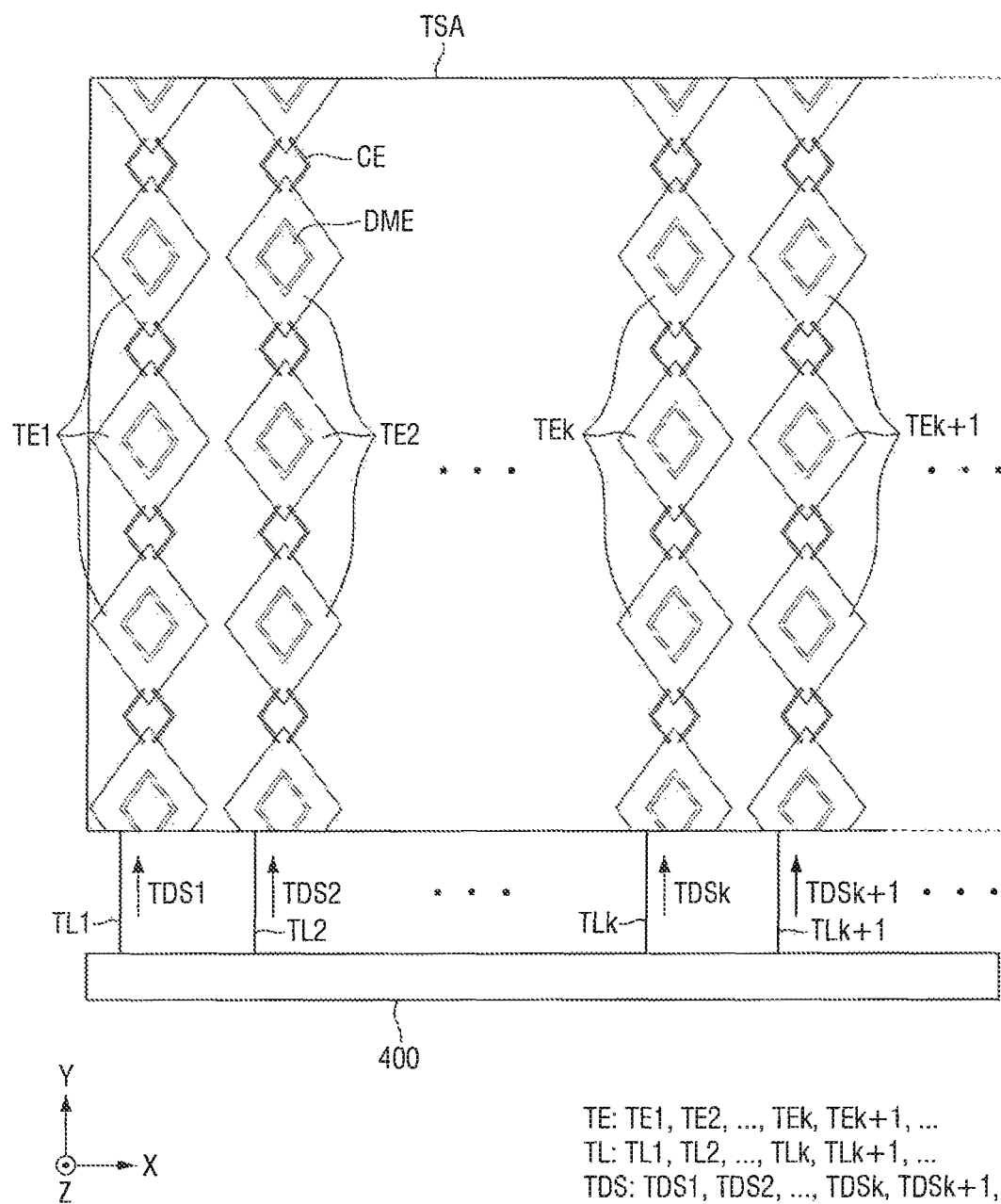
FIG. 9 is a diagram illustrating a plurality of driving electrodes, a plurality of driving lines, and a plurality of touch driving signals in a display device according to an embodiment of the present inventive concepts.

FIG. 9 is a diagram illustrating a plurality of driving electrodes, a plurality of driving lines, and a plurality of touch driving signals in a display device according to an embodiment of the present inventive concepts.

Referring to the embodiment of FIG. 9, the plurality of driving electrodes TE may include a first driving electrode TE1 to an $n^{th}$ driving electrode (n is a natural number equal to or greater than three). Each of the plurality of first driving electrodes TE1 may be arranged along the Y direction. Each of a plurality of $k^{th}$ driving electrodes TEk (k is a natural number that is two or more and less than n) may be arranged along the Y direction. Each of the first driving electrode TE1, the second driving electrode TE2, the $k^{th}$ driving electrode TEk, and the $(k+1)^{TH}$ driving electrode TEk+1 may be spaced apart from each other in the X direction. In an embodiment, the plurality of first driving electrodes TE1 adjacent in the Y direction may be electrically connected to each other through the bridge electrode CE, and may be connected to one driving line TL. Accordingly, each of the plurality of first driving electrodes TE1 arranged in the Y direction may receive a first touch driving signal TDS1 from a first driving line TL. Likewise, each of the plurality of second driving electrodes TE2 arranged in the Y direction may receive a second driving signal TDS2 from a second driving line TL2.

The touch driver 400 may supply the first touch driving signal TDS1 to the plurality of first driving electrodes TE1 through the first driving line TL1. The touch driver 400 may supply a $k^{th}$ touch driving signal TDSk to the plurality of $k^{th}$ driving electrodes TEk through a k driving line TLk. The touch driver 400 may supply a $k+1^{th}$ touch driving signal TDSk+1 to the plurality of $k+1^{th}$ driving electrodes TEk+1 through a K+1$^{th}$ driving line TLK+1. The first to k+1$^{th}$ touch driving signals TDS to TDSk+1 may each be a signal having a plurality of driving pulses. In an embodiment, the touch driver 400 may determine whether a touch is inputted and calculate touch coordinates based on an amount of change in mutual capacitance between the driving electrode TE and the sensing electrode RE.

Figure 10:
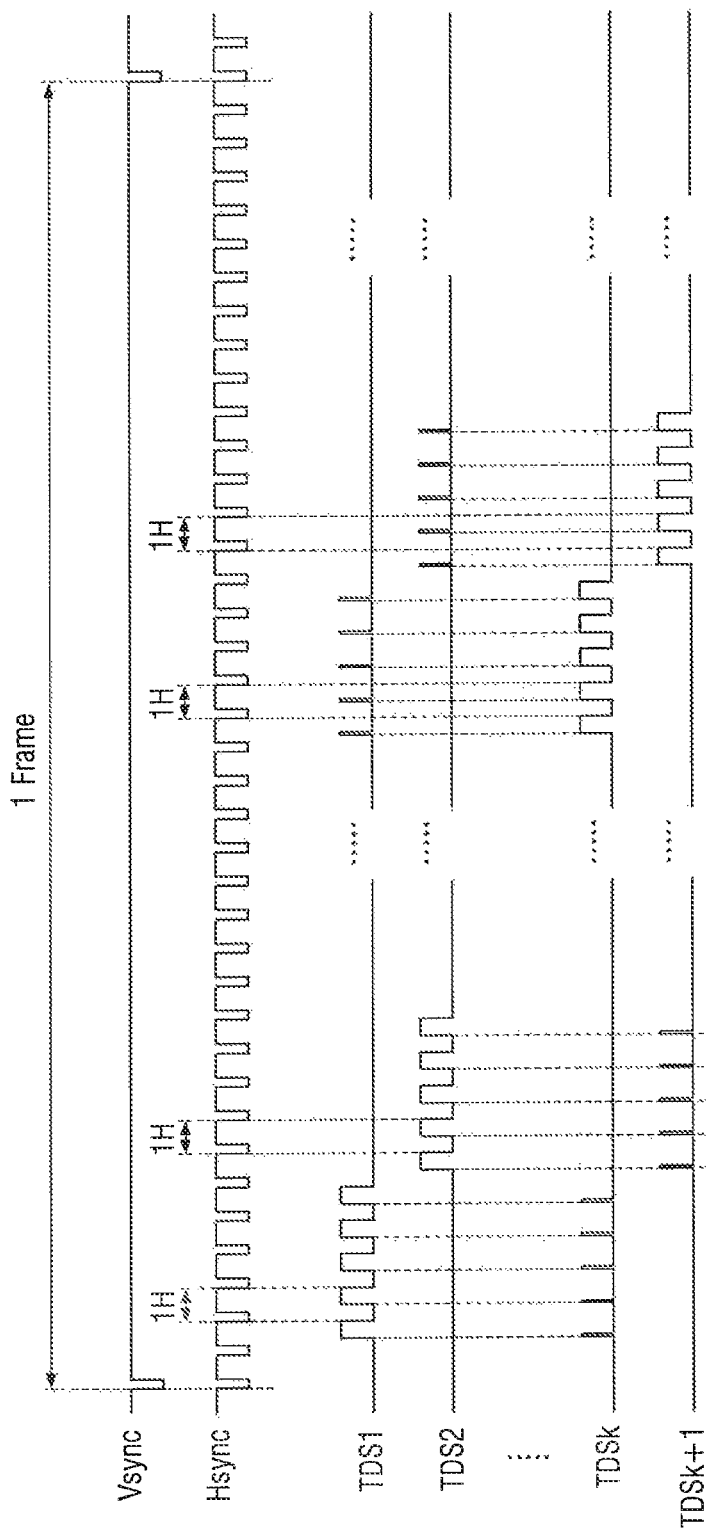
FIG. 10 is a timing diagram illustrating a touch driving signal in a low speed mode in a display device according to an embodiment of the present inventive concepts.

FIG. 10 is a timing diagram illustrating a touch driving signal in a low speed mode in a display device according to an embodiment of the present inventive concepts. Hereinafter, driving the display unit DU at a driving frequency of about 60 Hz by the display driver 200 is defined as a normal mode and driving the display unit DU at a driving frequency of about 30 Hz or less is defined as a low speed mode for convenience of explanation. However, the driving frequencies of the normal mode and the low speed mode are relative and are not limited to a specific driving frequency. Therefore, the driving frequencies in normal mode and low speed mode may vary according to embodiments of the present inventive concepts.

Referring to the embodiment of FIG. 10, the display driver 200 may drive the display unit DU at the driving frequency of about 60 Hz in the normal mode. The display driver 200 may drive the display unit DU at the driving frequency of about 30 Hz or less in the low speed mode. As shown in the embodiment of FIG. 10, the display driver 200 may receive a vertical synchronization signal Vsync and a horizontal synchronization signal Hsync from a main processor. In an embodiment, the vertical synchronization signal Vsync may have one low level during one frame period (1 Frame), and the horizontal synchronization signal Hsync may have one low level during one horizontal period (1H). However, embodiments of the present inventive concepts are not limited thereto. For example, as shown in the embodiment of FIG. 10, the vertical synchronization signal Vsync may have one low level at the beginning of each frame period (1 Frame) and the horizontal synchronization signal Hsync may have one low level during a beginning of each horizontal period (1H). However, embodiments of the present inventive concepts are not limited thereto.

The display driver 200 may supply a gate control signal including the vertical synchronization signal Vsync and the horizontal synchronization signal Hsync to the gate driver 210. The gate driver 210 may generate a plurality of gate signals from the vertical synchronization signal Vsync and the horizontal synchronization signal Hsync. The display driver 200 may supply the gate signal and the data voltage to the plurality of pixels SP during one frame period (1 Frame). For example, the display driver 200 may sequentially supply the gate signal to pixels SP arranged along a plurality of rows during one frame period (1 Frame), and the plurality of pixels SP may display an image in an order selected by the gate signal.

In an embodiment, the touch driver 400 may be synchronized with the display driver 200 in a low speed mode to drive the touch sensing unit TSU. The touch driver 400 may receive the vertical synchronization signal Vsync and the horizontal synchronization signal Hsync from the main processor. The touch driver 400 may generate a plurality of touch driving signals TDS including a first pulse width of a high level and a second pulse width of a high level during one frame period (1 Frame) based on the vertical synchronization signal Vsync and the horizontal synchronization signal Hsync. The first pulse width of a high level is different from a second pulse width of a high level. For example, as shown in the embodiment of FIG. 10, a pulse width of a low level of the horizontal synchronization signal Hsync may be smaller than a first pulse width of a high level of the touch driving signal TDS and the pulse width of a low level of the horizontal synchronization signal Hsync may be larger than a second pulse width of a high level of the touch driving signal TDS. However, embodiments of the present inventive concepts are not limited thereto. As shown in the embodiment of FIG. 9, the touch driver 400 may supply the first touch driving signal TDS1 to the plurality of first driving electrodes TE1 through the first driving line TL1, and may supply the $k^{th}$ touch driving signal TDSk to the plurality of $k^{th}$ driving electrodes TEk through the $k^{th}$ driving line TLk.

In an embodiment, the touch driver 400 may supply the touch driving signal TDS having the same phase to each of the plurality of driving lines TL during a plurality of consecutive frame periods in the low speed mode. For example, the phase of the first touch driving signal TDS1 supplied during the first frame period may be the same as the phase of the first touch driving signal TDS1 supplied during the second frame period immediately after the first frame period.

During the same horizontal period of one frame period (1 Frame), the touch driver 400 may supply the touch driving signal TDS having a first pulse width to a first partial portion of the driving lines among the plurality of driving lines TL, and may supply the touch driving signal TDS having a second pulse width that is smaller than the first pulse width to a second partial portion of the driving lines among the plurality of the driving lines TL that is different from the first partial portion of the plurality of driving lines during the same horizontal period of one frame period (1 Frame). In an embodiment, the touch driver 400 may supply, to each of the plurality of driving lines TL, the touch driving signal TDS having a first pulse width during a first partial portion of the horizontal periods of one frame period (1 Frame), and may supply the touch driving signal TDS having a second pulse width during a second partial portion of the horizontal periods of one frame period (1 Frame) that is different from the first partial portion of the horizontal periods of one frame period.

For example, during a first partial portion of the horizontal periods of one frame period (1 Frame) which includes the first horizontal period 1H shown in the embodiment of FIG. 10, as, the first touch driving signal TDS1 may have a first pulse width of a high level, and the $k^{th}$ touch driving signal TDSk may have a second pulse width of a high level. In addition, during a second partial portion of horizontal periods that is different from the first partial portion of horizontal periods which includes the third horizontal period 1H shown in the embodiment of FIG. 10, the first touch driving signal TDS1 may have a second pulse width of a high level, and the $k^{th}$ touch driving signal TDSk may have a first pulse width of a high level. Accordingly, the touch driver 400 may supply the touch driving signals TDS having different pulse widths from each other through each of the first driving line TL1 and the $k^{th}$ driving line TLk at the same time (e.g., the same horizontal period of one frame period).

For example, each of the first touch driving signal TDS1 and the $k^{th}$ touch driving signal TDSk that have a first pulse width of a high level may descend in synchronization with a falling time of the horizontal synchronization signal Hsync. In addition, the first touch driving signal TDS1 having a second pulse width of a high level may rise in synchronization with a rising time of the $k^{th}$ touch driving signal TDSk having a first pulse width of a high level, and the $k^{th}$ touch driving signal TDSk having a second pulse width of a high level may rise in synchronization with a rising time of the first touch driving signal TDS1 having a first pulse width of a high level.

Accordingly, the touch driver 400 may supply the touch driving signal TDS to the plurality of driving electrodes TE of the touch sensing unit TSU in a low speed mode or low frequency driving, and may sense an amount of change in capacitance between the plurality of driving electrodes TE and the plurality of the sensing electrodes RE. The touch driver 400 may determine whether a touch is inputted and calculate touch coordinates based on an amount of change in capacitance between the plurality of touch electrodes SEN.

Figure 11:
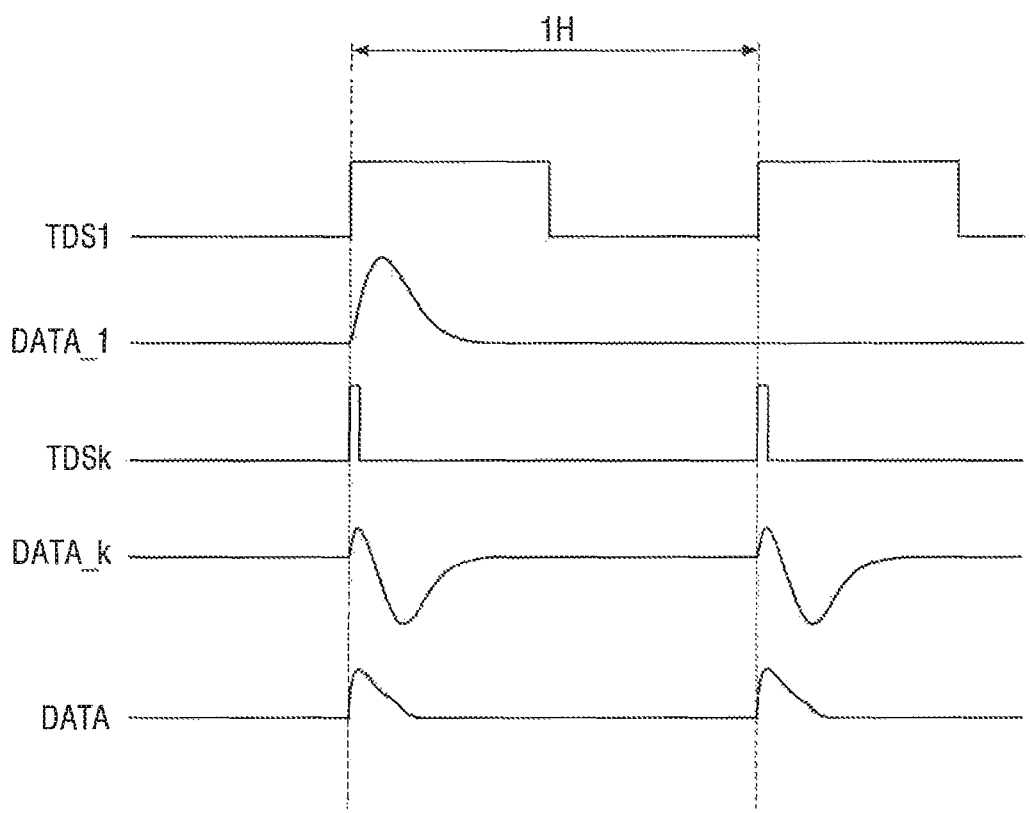
FIG. 11 is a timing diagram illustrating a change in a data voltage by a touch driving signal in a low speed mode in a display device according to an embodiment of the present inventive concepts.

FIG. 11 is a timing diagram illustrating a change in a data voltage by a touch driving signal in a low speed mode in a display device according to an embodiment of the present inventive concepts.

Referring to the embodiment of FIG. 11, when the touch driver 400 supplies the touch driving signal TDS to a plurality of driving electrodes TE through the driving line TL, coupling may occur between the plurality of driving electrodes TE and the second electrode CAT of the light emitting element ED (FIG. 7).

Referring to the embodiments of FIG. 11 with FIGS. 3 and 7, the plurality of driving electrodes TE may be disposed on the touch sensing unit TSU, the second electrode CAT of the light emitting element ED may be disposed on the light emitting element layer EML of the display unit DU, and the data line DL may be disposed on the thin film transistor layer TFTL of the display unit DU. In an embodiment, the second electrode CAT of the light emitting element ED may have an electrode shape that is common for all pixels, and the data line DL may be disposed on the same layer as the first connection electrode CNE1 or the second connection electrode CNE2 of the thin film transistor layer TFTL. Accordingly, when coupling occurs between the plurality of driving electrodes TE and the second electrode CAT of the light emitting element ED, coupling may occur even between the second electrode CAT of the light emitting element ED and the data line DL. As a result, when the touch driver 400 supplies the touch driving signal TDS to the plurality of driving electrodes TE, the data voltage of the data line DL may be synchronized and distorted at the rising edge or the falling edge of the touch driving signal TDS.

As shown in the embodiments of FIGS. 9-10, the touch driver 400, in a low speed mode, may supply the first touch driving signal TDS1 to the plurality of first driving electrodes TE1 through the first driving line TL1, and may supply the $k^{th}$ touch driving signal TDSk to the plurality of $k^{th}$ driving electrodes TEk through the $k^{th}$ driving line TLk. A data voltage DATA_1 coupled by the first touch driving signal TDS1 may rise due to the rising edge of the first touch driving signal TDS1, and then may descend after a period of time (e.g., a partial portion of the horizontal period 1H) while a first pulse width of a high level of the first touch driving signal TDS1 is maintained. A data voltage DATA_k coupled by the $k^{th}$ touch driving signal TDSk may rise due to the rising edge of the $k^{th}$ touch driving signal TDSk, and then may immediately descend due to the falling edge of the $k^{th}$ touch driving signal TDSk. When the $k^{th}$ touch driving signal TDSk has a second pulse width that is significantly smaller than the first pulse width, the data voltage DATA_k coupled by the $k^{th}$ touch driving signal TDSk may temporarily rise, then immediately descend after a period of time (e.g., a partial portion of the horizontal period 1H), and return to the existing data voltage.

The touch driver 400 may supply the first touch driving signal TDS1 having a first pulse width of a high level and may supply the $k^{th}$ touch driving signal TDSk having a second pulse width of a high level, during the same horizontal period of one frame period (1 Frame) to different driving lines TL, such as the first driving line TL1 and the $k^{th}$ driving line TLk. Accordingly, the data voltage DATA_1 coupled by the first touch driving signal TDS1 and the data voltage DATA_k coupled by the $k^{th}$ touch driving signal TDSk may be partially canceled out, and the display device 10 may reduce distortion of data voltage DATA flowing through the data line DL and reduce image quality distortion. Accordingly, the display device 10 may reduce distortion of the data voltage DATA coupled by the touch driving signal TDS and may reduce image quality distortion while maintaining reliability of touch sensitivity, by supplying the touch driving signal TDS having the same phase during a plurality of consecutive frame periods in a low speed mode or low frequency driving.

Figure 12:
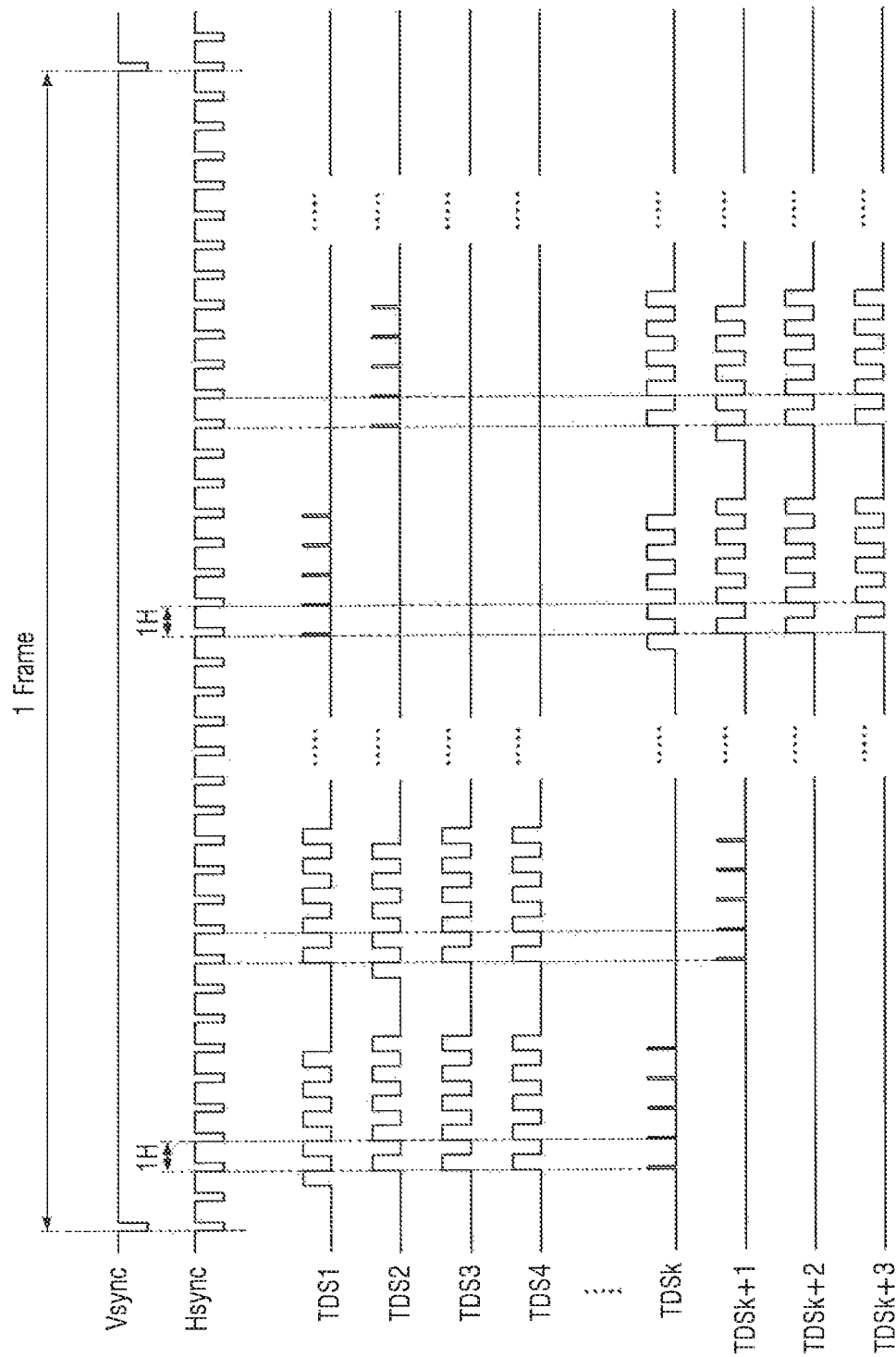
FIG. 12 is a timing diagram illustrating a touch driving signal in a low speed mode in a display device according to an embodiment of the present inventive concepts.

FIG. 12 is a timing diagram illustrating a touch driving signal in a low speed mode in a display device according to an embodiment of the present inventive concepts.

Referring to the embodiment of FIG. 12, the touch driver 400 may be synchronized with the display driver 200 in a low speed mode to drive the touch sensing unit TSU. The touch driver 400 may receive the vertical synchronization signal Vsync and the horizontal synchronization signal Hsync from the main processor. The touch driver 400 may generate a plurality of touch driving signals TDS including a first pulse width of a high level and a second pulse width of a high level during one frame period (1 Frame) based on the vertical synchronization signal Vsync and the horizontal synchronization signal Hsync. For example, in an embodiment, a pulse width of a low level of the horizontal synchronization signal Hsync may be smaller than a first pulse width of a high level of the touch driving signal TDS and may be larger than a second pulse width of a high level of the touch driving signal TDS. However, embodiments of the present inventive concepts are not limited thereto. In an embodiment, the touch driver 400 may generate the first pulse width of a high level and the second pulse width of a high level based on the horizontal synchronization signal having the low level. As shown in the embodiment of FIG. 9, the touch driver 400 may supply the first touch driving signal TDS1 to the plurality of first driving electrodes TE1 through the first driving line TL1, and may supply the $k^{th}$ touch driving signal TDSk to the plurality of $k^{th}$ driving electrodes TEk through the $k^{th}$ driving line TLk.

In an embodiment, the touch driver 400 may supply the touch driving signal TDS having the same phase to each of the plurality of driving lines TL during a plurality of consecutive frame periods in the low speed mode. For example, the phase of the first touch driving signal TDS1 supplied during the first frame period may be the same as the phase of the first touch driving signal TDS1 supplied during the second frame period immediately after the first frame period.

During the same horizontal period of one frame period (1 Frame), the touch driver 400 may supply the touch driving signal TDS having a first pulse width to a first partial portion of the driving lines among the plurality of driving lines TL, and may supply the touch driving signal TDS having a second pulse width that is smaller than the first pulse width to a second partial portion of the driving lines among the plurality of the driving lines TL that is different from the first partial portion of the driving lines. The touch driver 400 may supply the touch driving signal TDS having a first pulse width to each of the plurality of driving lines TL during a first partial portion of horizontal periods of one frame period (1 Frame), and may supply the touch driving signal TDS having a second pulse width during a second partial portion of horizontal periods of one frame period (1 Frame) that is different from the first partial portion of horizontal periods of one frame period.

For example, during a first partial portion of the horizontal periods of one frame period (1 Frame) which includes the first horizontal period 1H shown in the embodiment of FIG. 12, the first to fourth touch driving signals TDS1, TDS2, TDS3, and TDS4 may have a first pulse width of a high level, and the $k^{th}$ touch driving signal TDSk may have a second pulse width of a high level. In addition, during a second partial portion of horizontal periods that is different from the first partial portion of horizontal periods which includes the second horizontal period 1H shown in the embodiment of FIG. 12, the first touch driving signal TDS1 may have a second pulse width of a high level, and the $k^{th}$ to $(k+3)^{th}$ touch driving signals TDSk, TDSk+1, TDSk+2, and TDSk+3 may have a first pulse width of a high level that is larger than the second pulse width of a high level. Accordingly, the touch driver 400 may supply the touch driving signals TDS having different pulse widths from each other at the same time (e.g., the same horizontal period of one frame period). While the embodiment of FIG. 10 shows the touch driver 400 supplying touch driving signals TDS having two different pulse widths of a high level, embodiments of the present inventive concepts are not limited thereto and the numbers of the different pulse widths of a high level provided by the touch driver may be three or more in other embodiments.

For example, as shown in the embodiment of FIG. 12, the phase of the first touch driving signal TDS1 may be different from the phases of the second to fourth touch driving signals TDS2, TDS3, and TDS4 in a first partial portion of horizontal periods, and the phase of the $k^{th}$ touch driving signal TDSk may be different from the phases of the $(k+1)^{th}$ to $(k+3)^{th}$ touch driving signals TDSk+1, TDSk+2, and TDSk+3 in a second partial portion of horizontal periods. The first touch driving signal TDS1 having a first pulse width of a high level may descend in synchronization with a falling time of the horizontal synchronization signal Hsync. The second to fourth touch driving signals TDS2, TDS3, and TDS4 having a first pulse width of a high level may rise in synchronization with a falling time of the horizontal synchronization signal Hsync or a falling time of the first touch driving signal TDS1. The $k^{th}$ touch driving signal TDSk having a first pulse width of a high level may descend in synchronization with a falling time of the horizontal synchronization signal Hsync. The $(k+1)^{th}$ to $(k+_3)^{th}$ touch driving signals TDSk+1, TDSk+2, and TDSk+3 having a first pulse width of a high level may rise in synchronization with a falling time of the horizontal synchronization signal Hsync or a falling time of the $k^{th}$ touch driving signal TDSk.

In addition, the first touch driving signal TDS1 having a second pulse width of a high level may rise in synchronization with a rising time of the $(k+1)^{th}$ to $(k+3)^{th}$ touch driving signals TDSk+1, TDSk+2, and TDSk+3 having a first pulse width of a high level, and the $k^{th}$ touch driving signal TDSk having a second pulse width of a high level may rise in synchronization with a rising time of the second to fourth touch driving signals TDS2, TDS3, and TDS4 having a first pulse width of a high level.

The touch driver 400 may supply the first to fourth touch driving signals TDS1, TDS2, TDS3, and TDS4 having a first pulse width of a high level and may supply the $k^{th}$ touch driving signal TDSk having a second pulse width of a high level, during the same horizontal period of one frame period (1 Frame). Accordingly, the data voltage coupled by the first to fourth touch driving signals TDS1, TDS2, TDS3, and TDS4 and the data voltage DATA_k coupled by the $k^{th}$ touch driving signal TDSk may be partially canceled out, and the display device 10 may reduce distortion of data voltage DATA flowing through the data line DL and reduce image quality distortion. Accordingly, the display device 10 may reduce distortion of the data voltage DATA coupled by the touch driving signal TDS and may reduce image quality distortion while maintaining reliability of touch sensitivity, by supplying the touch driving signal TDS having the same phase during a plurality of consecutive frame periods in a low speed mode.

Figure 13:
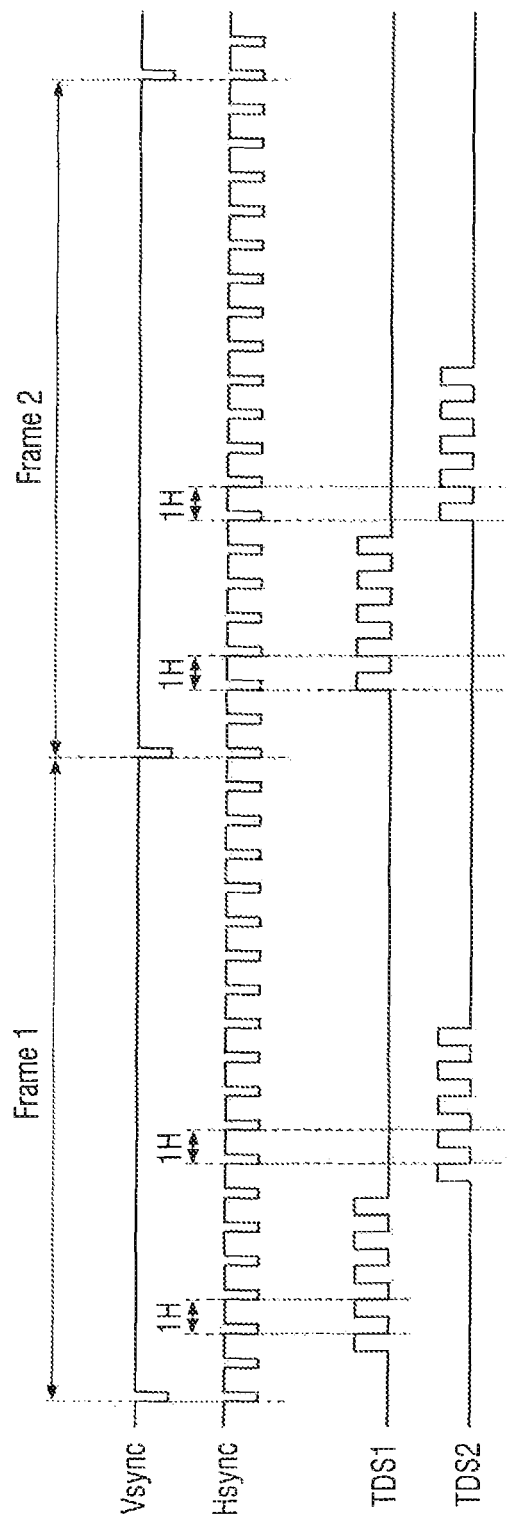
FIG. 13 is a timing diagram illustrating a touch driving signal in a normal mode in a display device according to an embodiment of the present inventive concepts.

FIG. 13 is a timing diagram illustrating a touch driving signal in a normal mode in a display device according to an embodiment of the present inventive concepts.

Referring to the embodiment of FIG. 13, the display driver 200 may drive the display unit DU at the driving frequency of about 60 Hz in the normal mode. The display driver 200 may drive the display unit DU at the driving frequency of about 30 Hz or less in the low speed mode. However, embodiments of the present inventive concepts are not limited thereto. The display driver 200 may receive a vertical synchronization signal Vsync and a horizontal synchronization signal Hsync from a main processor. The vertical synchronization signal Vsync may have one low level during one frame period (1 Frame), and the horizontal synchronization signal Hsync may have one low level during one horizontal period (1H). However, embodiments of the present inventive concepts are not limited thereto.

The touch driver 400 may be synchronized with the display driver 200 in the normal mode to drive the touch sensing unit TSU. The touch driver 400 may receive the vertical synchronization signal Vsync and the horizontal synchronization signal Hsync from the main processor. The touch driver 400 may generate the plurality of touch driving signals TDS having a first pulse width of a high level during one frame period (1 Frame) based on the vertical synchronization signal Vsync and the horizontal synchronization signal Hsync. For example, a pulse width of a low level of the horizontal synchronization signal Hsync may be smaller than a first pulse width of a high level of the touch driving signal TDS. However, embodiments of the present inventive concepts are not limited thereto. The touch driver 400 may supply the first touch driving signal TDS1 to the plurality of first driving electrodes TE1 through the first driving line TL1, and may supply the second touch driving signal TDS2 to the plurality of second driving electrodes TE2 through the second driving line TL2.

The touch driver 400 may supply the touch driving signals TDS, which have different phases from each other in each of first and second consecutive frame periods Frame1 and Frame2, to each of the plurality of driving lines TL in the normal mode. For example, the first touch driving signal TDS1 of the first frame period Frame1 may descend in synchronization with a falling time of the horizontal synchronization signal Hsync, and the first touch driving signal TDS1 of the second frame period Frame2 may rise in synchronization with a falling time of the horizontal synchronization signal Hsync. Accordingly, the data voltage coupled to the first touch driving signal TDS1 of the first frame period Frame1 and the data voltage coupled to the first touch driving signal TDS1 of the second frame period Frame2 may be partially canceled out.

The touch driver 400 may reduce distortion of the data voltage DATA flowing through the data line DL and may reduce image quality distortion while maintaining the reliability of touch sensitivity, by supplying the touch driving signals TDS having different phases from each other to each of the first and second consecutive frame periods Frame1 and Frame2 in the normal mode.

What is claimed is:

1. A display device comprising:
a display unit comprising a plurality of pixels;
a touch sensing unit disposed on the display unit and comprising a plurality of driving electrodes and a plurality of sensing electrodes; and
a touch driver configured to supply a touch driving signal to the plurality of driving electrodes through a plurality of driving lines, and receive a touch sensing signal from the plurality of sensing electrodes through a plurality of sensing lines,
wherein during a first horizontal period of one frame period, the touch driver supplies a touch driving signal having a first pulse width to a first partial portion of the plurality of driving lines among the plurality of driving lines and supplies a touch driving signal having a second. pulse width smaller than the first pulse width to a second partial portion of the plurality of driving lines among the plurality of the driving lines that is different from the first partial portion of the plurality of driving lines,
wherein the touch driver supplies, to each of the plurality of driving lines, a touch driving signal having the first pulse width during a first partial portion of horizontal periods of one frame period, and supplies a touch driving signal having the second pulse width during a second partial portion of horizontal periods of the one frame period that is different from the first partial portion of the horizontal periods.

2. The display device of claim 1, wherein the plurality of driving lines comprise a first driving line and a $k^{th}$ driving line, wherein k is a natural number of 2 or more,
during the first partial portion of horizontal periods, a first touch driving signal supplied to the first driving line has the first pulse width of a high level, and a $k^{th}$ touch driving signal supplied to the $k^{th}$ driving line has the second pulse width of a high level, and during the second partial portion of horizontal periods, the first touch driving signal has the second pulse width of a high level, and the $k^{th}$ touch driving signal has the first pulse width of a high level.

3. The display device of claim 2, wherein the first touch driving signal having the first pulse width of a high level descends in synchronization with a falling time of a horizontal synchronization signal.

4. The display device of claim 2, wherein the $k^{th}$ touch driving signal having the second pulse width of a high level rises in synchronization with a rising time of the first touch driving signal having the first pulse width.

5. The display device of claim 1, wherein:

the plurality of driving lines comprise a first driving line, a second driving line, a third driving line, a $k^{th}$ driving line, a $(k+1)^{th}$ driving line, and a $(k+2)^{th}$ driving line, wherein k is a natural number of 4 or more;

during the first partial portion of horizontal periods, a first touch driving signal supplied to the first driving line, a second touch driving signal supplied to the second driving line, and a third touch driving signal supplied to the third driving line have the first pulse width of a high level, and a $k^{th}$ touch driving signal supplied to the $k^{th}$ driving line has the second pulse width of a high level, and during the second partial portion of horizontal periods, the first touch driving signal has the second pulse width of a high level, and the $k^{th}$ touch driving signal, a $(k+1)^{th}$ touch driving signal supplied to the $(k+1)^{th}$ driving line, and a $(k+2)^{th}$ touch driving signal supplied to the $(k+2)^{th}$ driving line have the first pulse width of a high level.

6. The display device of claim 5, wherein a phase of the first touch driving signal is different from phases of the second and third touch driving signals in the first partial portion of horizontal periods, and a phase of the $k^{th}$ touch driving signal is different from phases of the $(k+1)^{th}$ and $(k+2)^{th}$ touch driving signals in the second partial portion of horizontal periods.

7. The display device of claim 5, wherein the first touch driving signal having the first pulse width of a high level descends in synchronization with a falling time of a horizontal synchronization signal.

8. The display device of claim 5, wherein the second and third touch driving signals having the first pulse width of a high level rises in synchronization with a falling time of a horizontal synchronization signal.

9. The display device of claim 5, wherein the $k^{th}$ touch driving signal having the second pulse width of a high level rises in synchronization with a rising time of the second and third touch driving signals having the first pulse width.

10. The display device of claim 1, wherein the touch driver generates a touch driving signal having the first pulse width of a high level and a touch driving signal having the second pulse width of a high level based on a horizontal synchronization signal having a low level in each of a plurality of horizontal periods.

11. The display device of claim 1, wherein each of the plurality of driving lines is connected to a plurality of driving electrodes arranged in a first direction, and each of the plurality of sensing lines is connected to a plurality of sensing electrodes arranged in a second direction crossing the first direction.

12. The display device of claim 1, wherein the touch driver supplies a touch driving signal having the same phase to each of the plurality of driving lines during a plurality of consecutive frame periods.

13. A display device comprising:

a display unit comprising a plurality of pixels;

a touch sensing unit disposed on the display unit and including a plurality of driving electrodes and a plurality of sensing electrodes;

a display driver configured to drive the display unit; and a touch driver configured to supply a touch driving signal to the plurality of driving electrodes through a plurality of driving lines, and receive a touch sensing signal from the plurality of sensing electrodes through a plurality of sensing lines, wherein when the display driver drives the display unit at a first frequency, the touch driver supplies touch driving signals having different phases from each other in each of first and second consecutive frame periods, to each of the plurality of driving lines, and when the display driver drives the display unit at a second frequency lower than the first frequency, during the same horizontal period of one frame period, the touch driver supplies a touch driving signal having a first pulse width to a first partial portion of driving lines among the plurality of driving lines, and supplies a touch driving signal having a second pulse width smaller than the first pulse width to a second partial portion of driving lines among the plurality of driving lines that is different from the first partial portion of the plurality of driving lines.

14. The display device of claim 13, wherein when the display driver drives the display unit at the first frequency, the touch driving signal of the first frame period descends in synchronization with a falling time of a horizontal synchronization signal, and the touch driving signal of the second frame period rises in synchronization with a falling time of the horizontal synchronization signal.

15. The display device of claim 13, wherein when the display driver drives the display unit at the second frequency, the touch driver supplies, to each of the plurality of driving lines, a touch driving signal having the first pulse width during a first partial portion of horizontal periods of one frame period, and supplies a touch driving signal having the second pulse width during a second partial portion of horizontal periods of the one frame period that is different from the first partial portion of the horizontal periods.

16. The display device of claim 15, wherein the plurality of driving lines comprise a first driving line and a $k^{th}$ driving line, wherein k is a natural number of 2 or more, when the display driver drives the display unit at the second frequency, during the first partial portion of horizontal periods, a first touch driving signal supplied to the first driving line has the first pulse width of a high level, and a $k^{th}$ touch driving signal supplied to the $k^{th}$ driving line has the second pulse width of a high level, and during the second partial portion of horizontal periods, the first touch driving signal has the second pulse width of a high level, and the $k^{th}$ touch driving signal has the first pulse width of a high level.

17. The display device of claim 16, wherein:

the first touch driving signal having the first pulse width of a high level descends in synchronization with a falling time of a horizontal synchronization signal; and the $k^{th}$ touch driving signal having the second pulse width of a high level rises in synchronization with a rising time of the first touch driving signal having the first pulse width.

18. The display device of claim 15, wherein:

the plurality of driving lines comprise a first driving line, a second driving line, a third driving line, a $k^{th}$ driving line, a $(k+1)^{th}$ driving line, and a $(k+2)^{th}$ driving line, wherein k is a natural number of 4 or more;

when the display driver drives the display unit at the second frequency, during the first partial portion of horizontal periods, a first touch driving signal supplied to the first driving line, a second touch driving signal supplied to the second driving line, and a third touch driving signal supplied to the third driving line have the first pulse width of a high level, and a $k^{th}$ touch driving signal supplied to the $k^{th}$ driving line has the second pulse width of a high level, and during the second partial portion of horizontal periods, the first touch driving signal has the second pulse width of a high level, and the $k^{th}$ touch driving signal $(k+1)^{th}$ touch driving signal supplied to the $(k+1)^{th}$ driving line, and a $(k+2)^{th}$ touch driving signal supplied to the $(k+2)^{th}$ driving line have the first pulse width of a high level.

19. The display device of claim 18, wherein the $k^{th}$ touch driving signal having the second pulse width of a high level rises in synchronization with a rising time of the second and third touch driving signals having the first pulse width.

20. A display device comprising:

a display unit comprising a plurality of pixels connected to data lines, the display unit including a display driver that supplies data voltages to the data lines;

a touch sensing unit disposed on the display unit and comprising a plurality of driving electrodes and a plurality of sensing electrodes; and a touch driver configured to supply a touch driving signal to the plurality of driving electrodes through a plurality of driving lines, and receive a touch sensing signal from the plurality of sensing electrodes through a plurality of sensing lines, wherein the touch driver is configured to supply a plurality of touch driving signals having different pulse widths from each other during a same horizontal period of one frame to reduce distortion of the data voltages that are coupled to the plurality of touch driving signals.

* * * * *